United States Patent
May et al.

(10) Patent No.: US 11,127,039 B2
(45) Date of Patent: Sep. 21, 2021

(54) DELIVERING GEO-CONTEXT INFORMATION TO A MOBILE DEVICE BASED ON PREDICTED MOBILE DEVICE LOCATIONS

(71) Applicant: ORACLE INTERNATIONAL CORPORATION, Redwood Shores, CA (US)

(72) Inventors: Martin May, Broomfield, CO (US); Joseph D. Pezzillo, Boulder, CO (US); Daniel W. Burcaw, Broomfield, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 782 days.

(21) Appl. No.: 14/815,758

(22) Filed: Jul. 31, 2015

(65) Prior Publication Data
US 2016/0034961 A1 Feb. 4, 2016

Related U.S. Application Data

(60) Provisional application No. 62/032,476, filed on Aug. 1, 2014.

(51) Int. Cl.
*G06Q 30/02* (2012.01)
*H04W 4/02* (2018.01)
(Continued)

(52) U.S. Cl.
CPC ..... *G06Q 30/0261* (2013.01); *G06Q 20/3224* (2013.01); *G06Q 30/0255* (2013.01);
(Continued)

(58) Field of Classification Search
CPC ........... G06Q 30/0261; G06Q 30/0265; G06Q 30/0266; G06Q 30/0267
See application file for complete search history.

(56) References Cited

U.S. PATENT DOCUMENTS 8,107,470 B2   1/2012   Zhu et al.
8,719,094 B1*  5/2014   Klein ................. G01C 21/3697
                                                    705/14.25
(Continued)

OTHER PUBLICATIONS

Perera, C et al. Context Aware Computing for The Internet of Things: A Survey. IEEE Communications Surveys & Tutorials, May 2013 [online], [retrieved on Mar. 26, 2021], Retrieved from the Internet: <URL:https://arxiv.org/pdf/1305.0982.pdf> (Year: 2013).*

*Primary Examiner* — Ilana L Spar
*Assistant Examiner* — Jonathan J Whitaker
(74) *Attorney, Agent, or Firm* — Potomac Law Group, PLLC

(57) ABSTRACT

A server communicates with a mobile device to deliver a mobile application to the mobile device. Software instructions of the mobile application are executed on the mobile device. Then, responsive to operations of the software instructions on the mobile device, the mobile device sends messages comprising location data such as GPS data or other location point attributes. The server receives the location data describing the location of the mobile device and performs logic and computations to determine predicted location points, which are in turn used to determine predicted regions or areas surrounding the predicted location points. The server selects geo-specific notifications (e.g., advertisements, coupons, etc.) based at least in part on the predicted region, and transmits the geo-specific notifications electronically through the network to the mobile device. The notifications are determined based on geo-specific predictions, geo-specific rules, geo-specific triggers, geo-specific
(Continued)

user data, geo-specific promotional data, and/or geo-specific context data.

25 Claims, 21 Drawing Sheets

(51) Int. Cl.
   *H04W 4/021* (2018.01)
   *G06Q 20/32* (2012.01)
(52) U.S. Cl.
   CPC ..... *G06Q 30/0259* (2013.01); *G06Q 30/0266* (2013.01); *G06Q 30/0267* (2013.01); *H04W 4/021* (2013.01); *H04W 4/027* (2013.01)

(56) References Cited

U.S. PATENT DOCUMENTS

| | | | |
|---|---|---|---|
| 8,768,308 B2 | 7/2014 | Kim et al. | |
| 9,191,788 B2 | 11/2015 | Somekh et al. | |
| 9,529,089 B1* | 12/2016 | Buether | G01S 19/05 |
| 9,805,392 B2 | 10/2017 | Connelly et al. | |
| 9,898,498 B2 | 2/2018 | Tuatini et al. | |
| 9,922,347 B1* | 3/2018 | Burcham | G06F 3/0482 |
| 2002/0065713 A1* | 5/2002 | Awada | G06Q 30/02 705/14.39 |
| 2004/0117246 A1* | 6/2004 | Applebaum | G01C 21/26 705/14.5 |
| 2005/0216547 A1* | 9/2005 | Foltz-Smith | G06Q 30/02 709/200 |
| 2007/0270162 A1* | 11/2007 | Hampel | H04L 67/18 455/456.1 |
| 2008/0195664 A1* | 8/2008 | Maharajh | G06F 17/30035 |
| 2009/0012955 A1* | 1/2009 | Chu | G01C 21/3679 |
| 2009/0133121 A1* | 5/2009 | Falk | G08G 1/0962 726/22 |
| 2011/0040626 A1* | 2/2011 | Lin | G01C 21/3682 705/14.63 |
| 2012/0123904 A1* | 5/2012 | Foerster | G06Q 30/0625 705/26.62 |
| 2012/0158289 A1* | 6/2012 | Bernheim Brush | G01C 21/3484 701/425 |
| 2012/0270558 A1* | 10/2012 | Busch | H04W 76/40 455/456.1 |
| 2012/0303448 A1* | 11/2012 | Psillas | G06Q 40/02 705/14.49 |
| 2013/0031506 A1* | 1/2013 | Diaz | G06F 17/3087 715/781 |
| 2013/0045751 A1* | 2/2013 | Chao | G01S 5/16 455/456.1 |
| 2013/0066720 A1* | 3/2013 | Schwarz | G06Q 30/02 705/14.53 |
| 2013/0069798 A1* | 3/2013 | Jones | G08G 1/096775 340/905 |
| 2014/0067540 A1* | 3/2014 | Williams | G06Q 30/0261 705/14.58 |
| 2014/0074820 A1* | 3/2014 | Murphy | G06Q 30/0256 707/722 |
| 2014/0129337 A1* | 5/2014 | Otremba | G06Q 30/0261 705/14.58 |
| 2014/0172576 A1* | 6/2014 | Spears | G06Q 30/0266 705/14.63 |
| 2014/0257949 A1* | 9/2014 | Gishen | G06Q 30/0252 705/14.5 |
| 2015/0112808 A1* | 4/2015 | Coatney | G06Q 30/0261 705/14.58 |
| 2015/0269846 A1* | 9/2015 | De Prins | G08G 5/0043 701/120 |
| 2015/0347603 A1* | 12/2015 | Jhunjhnuwala | G06F 16/9535 707/734 |
| 2015/0354969 A1* | 12/2015 | Chao | G01S 5/02 701/533 |
| 2015/0363830 A1* | 12/2015 | Abuelsaad | G06Q 30/0266 705/14.63 |
| 2016/0006264 A1* | 1/2016 | Alperin | H02J 5/005 307/104 |
| 2016/0019592 A1* | 1/2016 | Muttineni | H04W 4/029 705/14.58 |

* cited by examiner

| Frequency of Updates | Size of Update | Platform Effects | Adverse Effects |
|---|---|---|---|
| High | Small | Too much power consumption and/or too much bandwidth usage | User's won't use the application (too power hungry) |
| High | Large | Too much power consumption and too much data space needed | Too many messages that are irrelevant to users' location |
| Low | --- | Either not enough data in update (small packets of data) or data becomes quickly out of date | Messages that are irrelevant to users' location are presented |
| Medium | Small | Gets out of date too quickly | Irrelevant messages |
| Medium | Large | Too much storage space needed | Irrelevant messages |
| Adaptive/Predictive | Adaptive/Predictive | Right amount of data delivered at the right time | Correct messages presented at the right time |

FIG. 1B

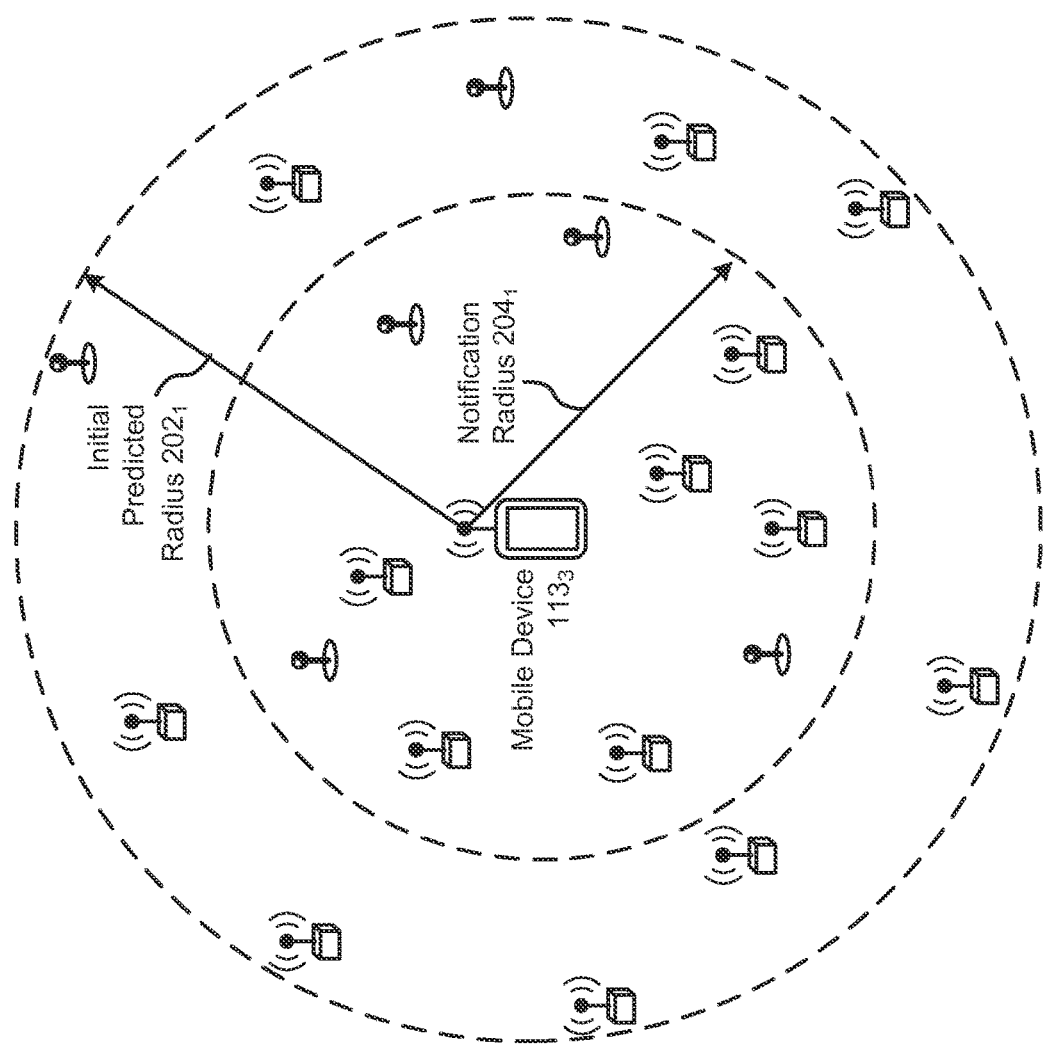
FIG. 2A1

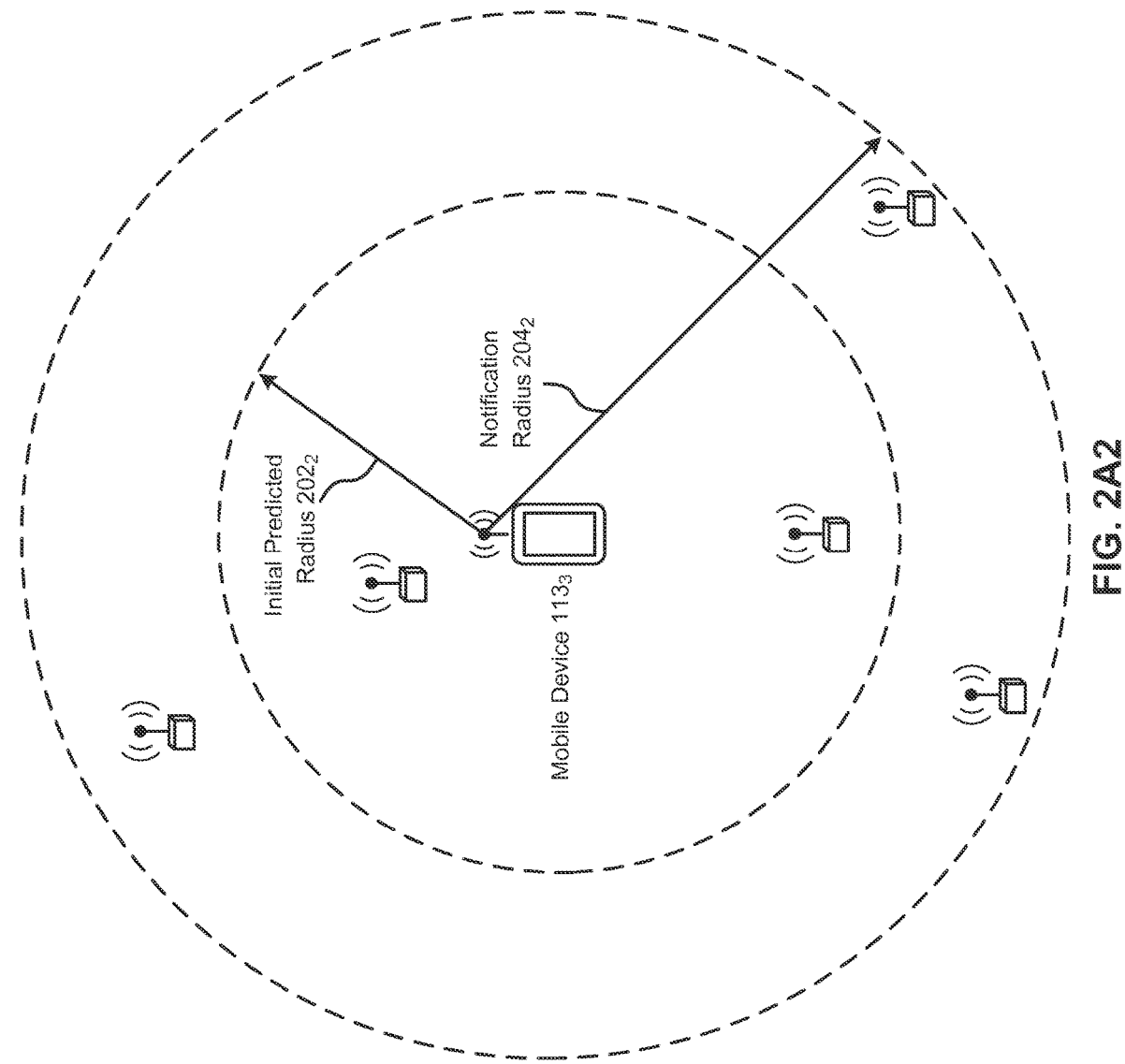
FIG. 2A2

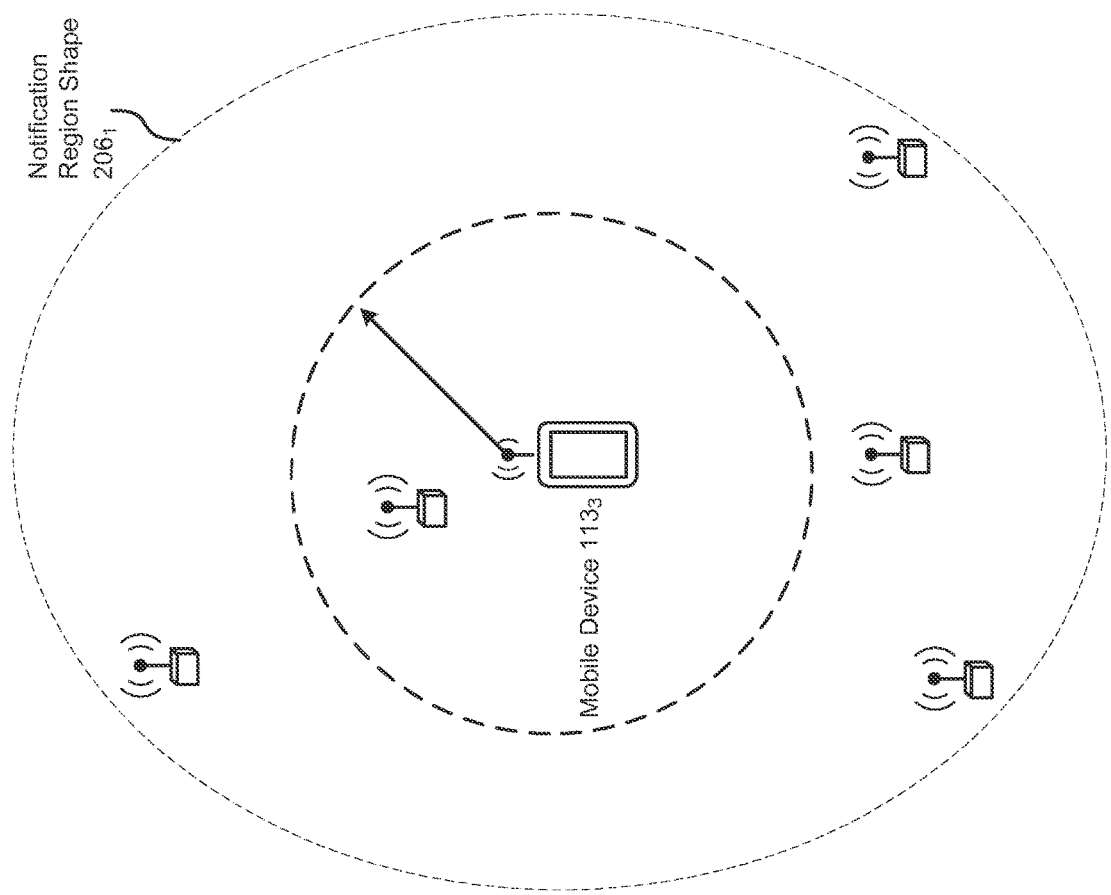

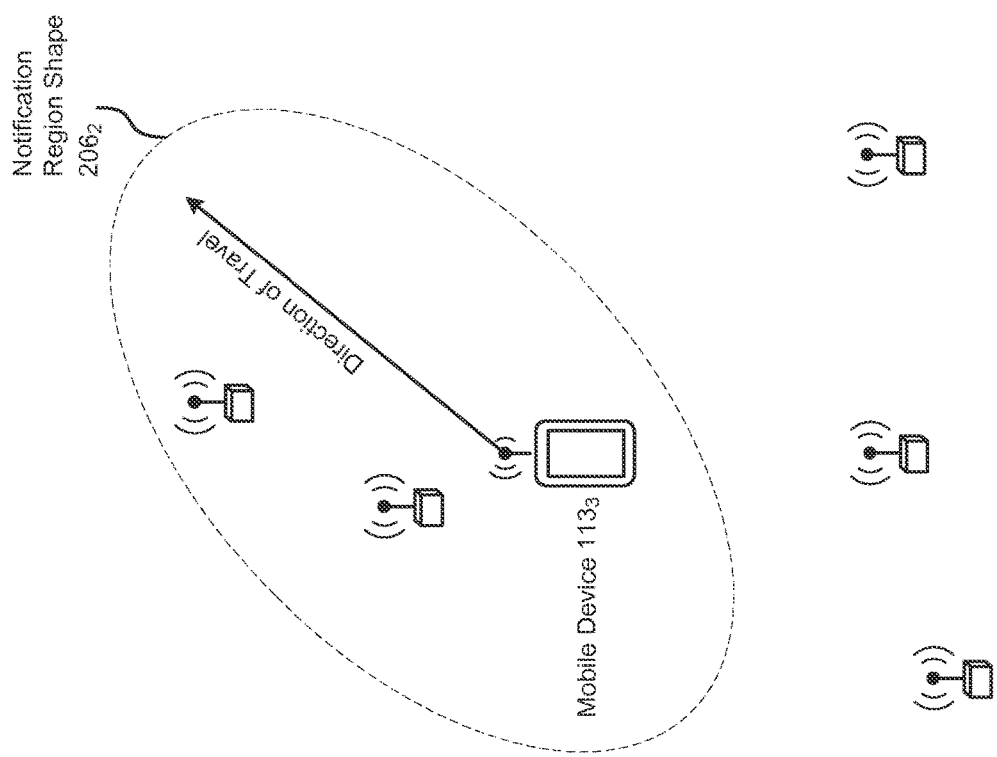
FIG. 2A4

DELIVERING GEO-CONTEXT INFORMATION TO A MOBILE DEVICE BASED ON PREDICTED MOBILE DEVICE LOCATIONS

RELATED APPLICATIONS

The present application claims the benefit of priority to U.S. Provisional Patent Application Ser. No. 62/032,476, entitled, "METHOD AND APPARATUS FOR DELIVERING GEO-CONTEXT NOTIFICATIONS TO A MOBILE COMPUTER", filed Aug. 1, 2014, which is hereby incorporated by reference in its entirety

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of mobile computing, and more particularly to techniques for delivering geo-context information to a mobile device based on predicted user locations.

BACKGROUND

As the use of mobile devices becomes more ubiquitous, advertisers and brand owners strive to leverage the physical or geographical location of the mobile device and the intent of a respective mobile device user in order to drive highly targeted advertising campaigns. Some systems deploy GPS technology to provide geographically relevant data. For example, a search for restaurants using the map application on a mobile phone will use GPS to determine a list of restaurants near the current device location. In such cases, the location coordinates (e.g., longitude and latitude) can uniquely identify a given restaurant or some other point of interest (POI). To establish a more precise (e.g., "hyperlocal") location of a mobile device, other systems deploy one or more small wireless transmitters or "location beacons" that communicate with nearby devices using short-range wireless technology (e.g., Bluetooth low energy or BLE technology). In corresponding hyperlocal cases, the term "nearby" refers to the theoretical range of BLE beacons (e.g., about 100 meters). Further, each location beacon can have a universally unique identifier (e.g., UUID) that can be associated with a relatively small subject area (e.g., product end cap in a grocery store).

Mobile device location detection capabilities can be used by mobile advertisers in providing geo-context targeting. For example, a supermarket can develop a mobile device application (e.g., "app") that shows the mobile device user the closest store locations and/or notifies the user of coupons or promotions that the store is currently running. The app might specifically detect when the user is near a certain area of the store (e.g., in front of a promotional display) for a specified length of time (e.g., more than the few seconds it takes to walk by) and provide a special message (e.g., a coupon) for the product under promotion. Such "push" messages (e.g., notifications, promotions, coupons, alerts, etc.) can be triggered when the app is running, when the app is inactive (e.g., running in the background), or when the phone is in sleep mode.

However, app designers are often limited by various platform constraints present in the mobile device. Some such platform limitations are from natural limitations of available computing resources, scope and permissions pertaining to operating system capabilities, battery capacity, and network connectivity and bandwidth. The app designer might be further be limited by constraints of changing mobile device operating environments such as changing access between cellular access versus wireless service availability.

Some limitations are imposed limitations. For example, the operating system for Apple iPhones allocates a maximum of 20 regions (e.g., geographical region, location beacon region, etc.) to a given app in order to conserve system resources. Platform limitations (e.g., maximum of 20 regions) present severe limitations that are not circumvented by legacy techniques. Moreover, legacy approaches fail when the network connection between the mobile device and the servers is interrupted (e.g., in a "No Service" area). Some naïve approaches store larger geographic regions (e.g., comprising multiple location beacons and/or POI location coordinates) in locations accessible to the mobile device (e.g., such that fewer updates are performed as the mobile device changes locations); however, location and targeting precision desired by today's mobile advertisers is lost.

BRIEF DESCRIPTION OF THE DRAWINGS

The drawings described below are for illustration purposes only. The drawings are not intended to limit the scope of the present disclosure.

FIG. 1B is a chart that compares predictive approaches to other approaches for delivering geo-context information to a mobile device.

FIG. 2A1, FIG. 2A2, FIG. 2A3, and FIG. 2A4 depict region boundaries defining sets of networked location points as used in systems for delivering geo-context information to a mobile device based on predicted user locations, according to an embodiment.

FIG. 3 is a block diagram of a system for delivering geo-context information to a mobile device based on predicted user locations, according to some embodiments.

FIG. 4 presents a geo-context information update technique as used in systems for delivering geo-context information to a mobile device based on predicted user locations, according to some embodiments.

DETAILED DESCRIPTION

Figure 1A:
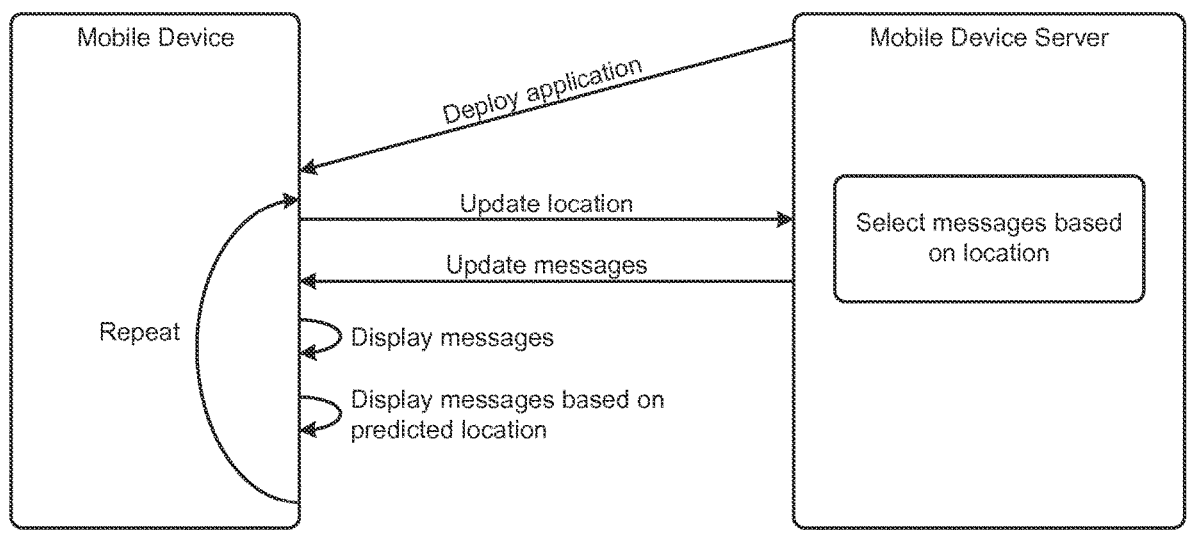
FIG. 1A depicts a mobile device in communication with a server.

Some embodiments of the present disclosure address the problem of overcoming location tracking limitations of mobile devices and operating environments, and some embodiments are directed to approaches for using locally stored location information to provide timely geo-context information to a mobile device user in a broad range of computing environments. More particularly, disclosed herein and in the accompanying figures are exemplary environments, systems, methods, and computer program products for delivering geo-context information to a mobile device based on predicted user locations.

OVERVIEW

As the use of mobile devices becomes more ubiquitous, advertisers and brand owners strive to leverage the physical or geographical location of the mobile device and the intent of a respective mobile device user in order to drive highly targeted advertising campaigns. Some systems deploy GPS technology to provide geographically relevant data, and other systems deploy location beacons to detect a more precise (e.g., "hyperlocal") location of a mobile device. Such mobile device location detection capabilities can be used by mobile advertisers in providing geo-context targeting. For example, a supermarket can develop a mobile device application (e.g., "app") that shows the mobile device user the closest store locations and/or notifies the user of coupons or promotions that the store is currently running. The app might specifically detect when the user is near a certain end cap for a specified length of time and provide a special promotion for the end cap product.

As previously mentioned, app designers are often limited by various platform constraints present in the mobile device platform. Some such platform constraints or limitations arise as a consequence of limitations of available computing resources, scope and permissions pertaining to operating system capabilities, battery capacity, and network availability and bandwidth. Discussed hereunder are approaches for delivering geo-context information to a mobile device based on predicted user locations.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts a mobile device in communication with a server. As shown, a server deploys a mobile app to a mobile device. As the mobile device is moved from place to place (e.g., in a car or bus or train, etc.) the location changes. Certain push notifications can be based not only location information, but also context information and user interest information from various online advertising data sources. For example, a coffee house advertiser might not only detect when a user carrying a mobile device is near a certain store, but also detect the current local temperature (e.g., 80 degrees F.) and various user profile attributes (e.g., purchased iced latte within past 30 days), and provide a coupon for 20% off iced lattes. The mobile device updates the changed location periodically, and the server responds with messages that are relevant to the location (e.g., a list of gas stations nearby, a list of coffee shops that are nearby, coupons for nearby eateries, etc.). As the mobile device continues to be moved from place to place, geo-relevant message are displayed (e.g., there is a 50% off coupon for the coffee shop at the next corner). The shown messages and operations exemplify one technique for displaying messages that are deemed to pertain to a predicted location (e.g., "the next corner"). This technique can include structures and functions so as to address mobile device platform limitations (e.g., see a selection of mobile device platform limitations in FIG. 1B) while determining, delivering and displaying highly-relevant messages and/or notifications. Predictions and selections of messages and/or notifications can be made at the server so as to deliver highly-relevant sets of geo-context information to a mobile device. As shown and discussed as pertains to FIG. 1B, a predictive approach for delivering geo-context information to a mobile device serves to address mobile device platform limitations while determining, delivering and displaying highly-relevant messages and/or notifications to a user of a mobile device.

The mobile device is configured to accept software instructions from a server (e.g., by a download of a set or software instructions from the server). Execution of the software instructions on the mobile device serves to perform acts on the mobile device, by using the software instructions in combination with other resources of the mobile device. Strictly as examples, the resources of the mobile device can include a central processing unit, a multi-core processing unit, a GPS receiver, an accelerometer, and/or any other modules that perform or facilitate the performance of calculations (e.g., proximity calculations).

FIG. 1B is a chart 1B00 that compares predictive approaches to other approaches for delivering geo-context information to a mobile device. Many of the approaches rely on predetermined location refresh rates and/or predetermined sets of message or notification data to be delivered to the mobile device, and many of the approaches rely on proximity calculations being done by the mobile device. In comparison, the shown adaptive approaches (see the highlighted portion of chart 1B00) rely on adaptively-determined location refresh rates and/or adaptively-determined sets of message or notification data to be delivered to the mobile device. Some results from using adaptively-determined sets of message or notification data is shown in chart 1B00. A system such as is depicted in the following figure can be deployed to achieve such results.

Figure 1C:
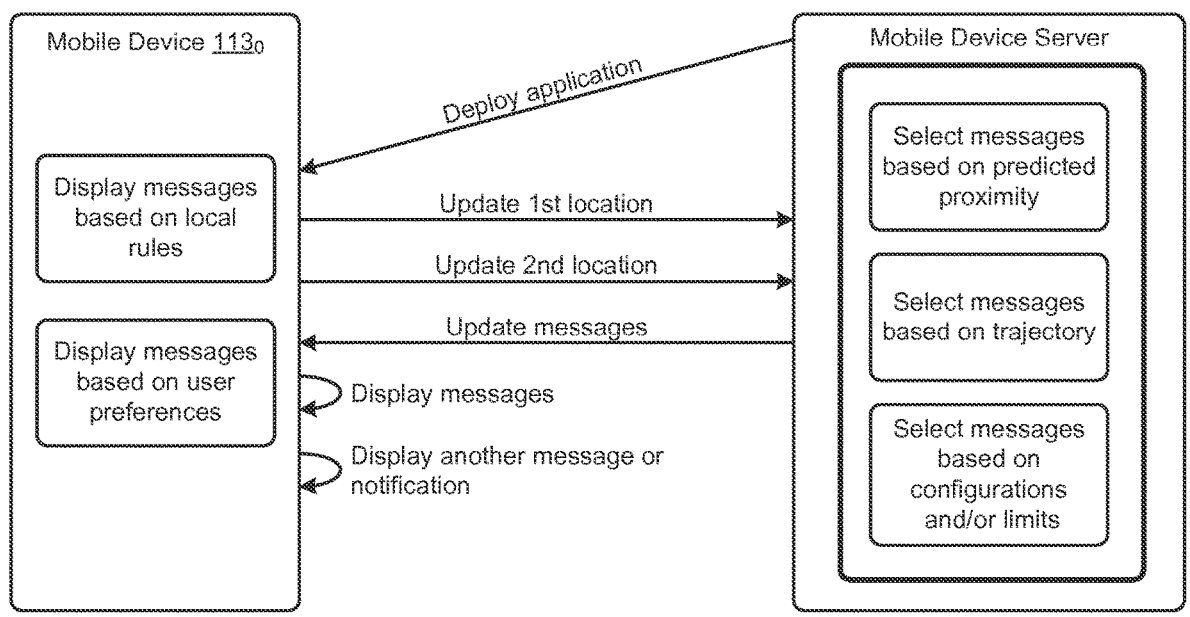
FIG. 1C depicts a system comprising a mobile device in communication with a server that supports a protocol for delivering geo-context information to a mobile device based on predicted user locations, according to an embodiment.

FIG. 1C depicts a system 1C00 comprising a mobile device $113_0$ in communication with a mobile device server 100 that supports a protocol for delivering geo-context information to a mobile device based on predicted user locations, according to an embodiment.

In some embodiments, delivering geo-context information to a mobile device based on predicted user locations can be implemented by providing one or more geo-context protocols that operate to identify datasets of items (e.g., messages and notifications), which items are associated with one or more predicted locations (e.g., predicted locations that a user of a mobile device might visit). The datasets can include various location point attributes that are related to a particular predicted location such as location beacon UUID, location coordinates, associated notifications, notification rules and triggers, and other attributes. As the user and the mobile device traverse toward one or more of the predicted locations, the geo-context protocol and associated operations serve to exchange information so as to determine which notifications to present to the user. In some embodiments, additional information (e.g., context information, user profile information, etc.) can be accessed at a data management server to determine the notification to be presented.

Such techniques overcome many mobile device and operating environment limits to geo-context advertising. For example, periodic delivery of new datasets of items (e.g., messages and notifications) to the mobile device enables geo-context targeting of many more locations than would be allowed by the mobile device operating system. Systems such as is depicted in FIG. 1C can do so without needing the bandwidth and power required by legacy approaches that continually update the location information. As another example, the system 1C00 of FIG. 1C enables notifications to be presented when the mobile device network connectivity is interrupted. In addition, in some embodiments, the mobile device can communicate with a mobile device server 100 to exchange contextual information such as user preferences, user purchase history, user purchase behavior, or the current weather at the user's location. Such contextual information can be used to create highly customized, dynamic notifications.

In some embodiments, a mobile device $113_0$ sends a message to update a location, and then sends a second message to update a second location. The location and/or comparisons between the locations can be used to select messages based on a predicted proximity, and/or comparisons between the locations can be used to select messages based on a trajectory (e.g., speed and direction). Such proximities and trajectories can be determined using messaging, and such messaging can be implemented in a wide range of operating environments (e.g., terrestrial, at sea, in an aircraft, etc.).

Figure 1D:
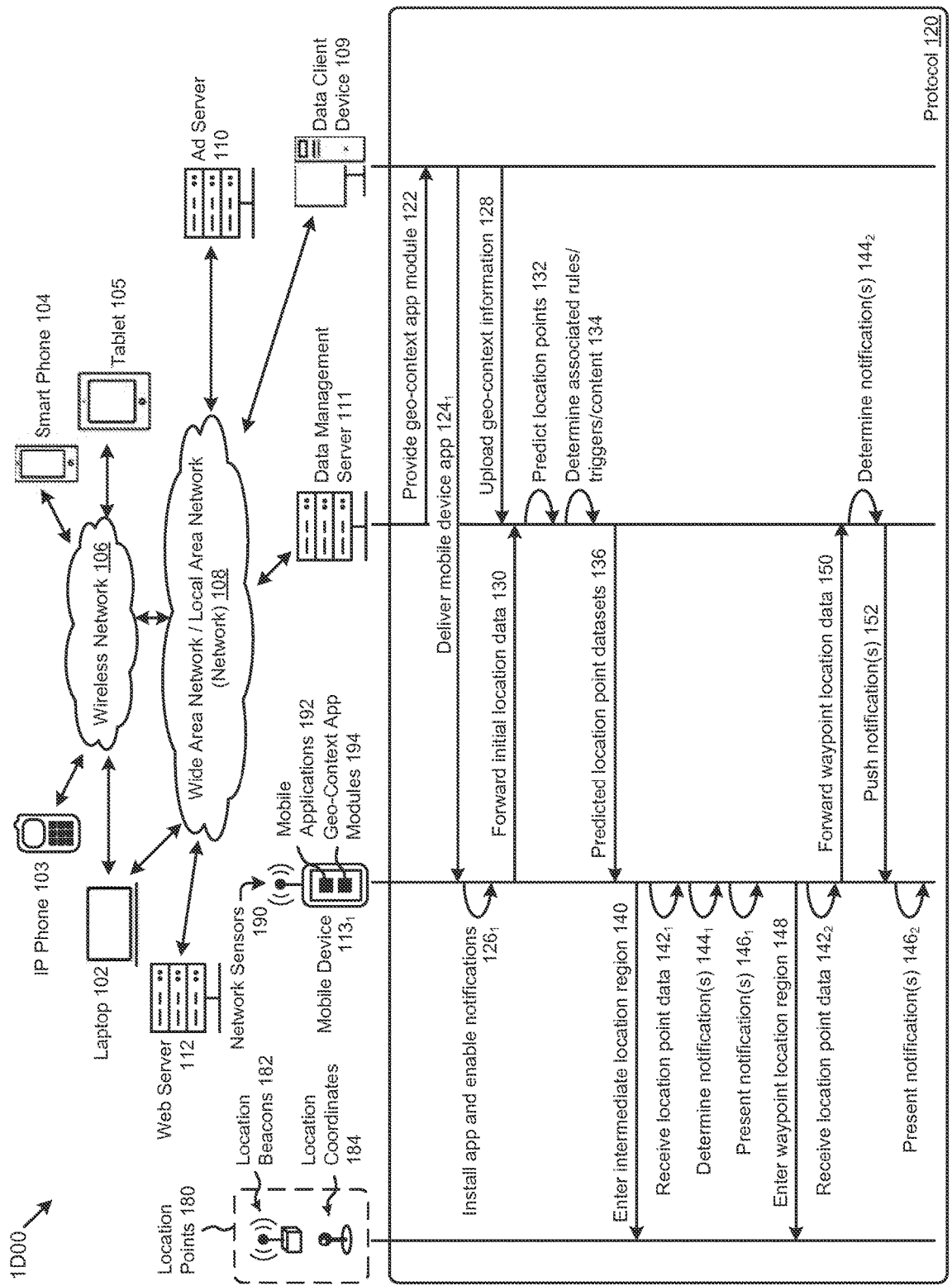
FIG. 1D exemplifies an operating environment that supports a protocol for delivering geo-context information to a mobile device based on predicted user locations, according to an embodiment.

FIG. 1D exemplifies an operating environment 1D00 that supports a protocol for delivering geo-context information to a mobile device based on predicted user locations. As an option, one or more instances of operating environment 1D00 or any aspect thereof may be implemented in the context of the architecture and functionality of the embodiments described herein. Also, the operating environment 1D00 or any aspect thereof may be implemented in any desired environment.

As shown in FIG. 1D, operating environment 1D00 comprises one or more instances of a web server 112, one or more instances of a data management server 111, one or more instances of an ad server 110, one or more instances of a data client device 109 (e.g., server, desktop computer, etc.), and a variety of types and instances of user devices (e.g., a laptop 102, an IP phone 103, a smart phone 104, and a tablet 105). The aforementioned servers and devices can communicate through a wireless network 106 and a network 108 (e.g., a wide area network (WAN), a local area network (LAN), etc.). The operating environment 1D00 further comprises a representative instance of a mobile device $113_1$ (e.g., smart phone 104) that can execute software instructions comprising one or more mobile applications 192. The mobile applications 192 can further comprise and/or communicate with one or more geo-context app modules 194 to augment the capability and functionality of the mobile applications 192. Also, the mobile device $113_1$ can comprise one or more network sensors 190 (e.g., a GPS sensor, Bluetooth sensor, WiFi antenna, cell-phone antenna, near-field antenna, etc.). The network sensors 190 can allow the mobile device $113_1$ to interface with one or more location beacons 182. The location beacons 182 and one or more location coordinates 184 can comprise a certain set of location points 180. The location points 180 specify various points of interests such as retail stores (e.g., represented by instances of location coordinates 184) or different areas within a store (e.g., represented by an instance of location beacons 182). Though not shown for simplicity, the mobile device $113_1$ and the location beacons 182 can be connected to wireless network 106 and/or network 108.

Also shown in environment 1D00 is a protocol 120 that depicts operations, communications, and interactions on and among mobile device $113_1$, location points 180, data management server 111, and data client device 109. Specifically, protocol 120 depicts components and operations for using locally stored location information to provide timely geo-context information to a mobile device user in a broad range of computing environments, according to some embodiments. In this example, a data management provider at data management server 111 can provide a geo-context app module to a data client user (e.g., mobile advertiser, publisher, retail brand owner, etc.) at the data client device 109 to assist in developing a mobile app with geo-context capability according to the herein disclosed techniques (see message 122). The data client user can the deliver the mobile app to a user of the mobile device $113_1$ (see message $124_1$), and the user can install the app and enable notifications (see operation $126_1$). The data client user at the data client device 109 can also upload geo-context information (e.g., rules, triggers, notification content, etc.) associated with various points of interest of the data client (e.g., stores, kiosks, product aisles, end caps, etc.) to data management server 111 (see message 128). For example, in some embodiments, geo-context rules and triggers can be used by the mobile device $113_1$ and/or the data management server 111 to determine certain responses (e.g., notifications) to the mobile device $113_1$ entering or leaving the regions associated with one or more location points. Further, geo-context notification content can comprise structured information (e.g., coupon HTML content, text message content, etc.) and/or sensory alerts (e.g., auditory alerts, vibration alerts, light alerts, etc.) that can in turn be presented or effected by the mobile device $113_1$.

As shown in protocol 120, for example, mobile device $113_1$ can forward initial location data comprising location point attributes (e.g., GPS location coordinates, location beacon UUID, etc.) to the data management server 111 (see message 130) to be used to predict location points the mobile device $113_1$ might encounter (see operation 132). For example, the predicted location points can comprise the location points 180 (e.g., the nearest 200 location points). The data management server 111 can further determine information (e.g., rules, triggers, notification content, etc.) associated with the predicted location points (see operation 134). The predicted location point datasets comprising the location point information (e.g., location point attributes) can then be pushed to the mobile device $113_1$ (see message 136). At some later time, the mobile device $113_1$ might enter an intermediate location region comprising certain instances of location points 180 (see message 140). The mobile device $113_1$ can then receive location point data (e.g., GPS location coordinates, location beacon UUIDs, etc.) associated with the intermediate region (see operation $142_1$). Using the locally stored predicted location point datasets (e.g., rules, triggers, content, etc.), the mobile device can determine (e.g., by the mobile device app) one or more notifications to be presented to the user (see operation $144_1$ and operation $146_1$). For example, the notification might be a visual alert, a vibration alert, and/or an auditory alert. The mobile device $113_1$ might then enter a waypoint location region (see message 148) and receive location point data associated with the waypoint location region (see operation $142_2$). In this case, the mobile device $113_1$ can forward the waypoint location data to the data management server 111 (see message 150) to be used by the data management server 111 to determine one or more notifications (see operation $144_2$) to be pushed to the mobile device (see message 152) for presentation (see operation $146_2$). For example, the waypoint location point data might reference an instance of location points 180 that is not included in the locally stored predicted location points. In this case, the data management server 111 can be accessed to determine the corresponding notifications to be served. As another example, the data management server 111 can be accessed to augment the locally stored geo-context information with information (e.g., user profile categories, third-party advertising, cross-device targeting, etc.) that is not included in the predicted location point datasets pushed to the mobile device $113_1$. An example commercial environment that presents a need for using locally stored location information to provide timely geo-context information to a mobile device user in a broad range of computing environments as depicted in protocol 120 and described herein, is disclosed in FIG. 1E.

Figure 1E:
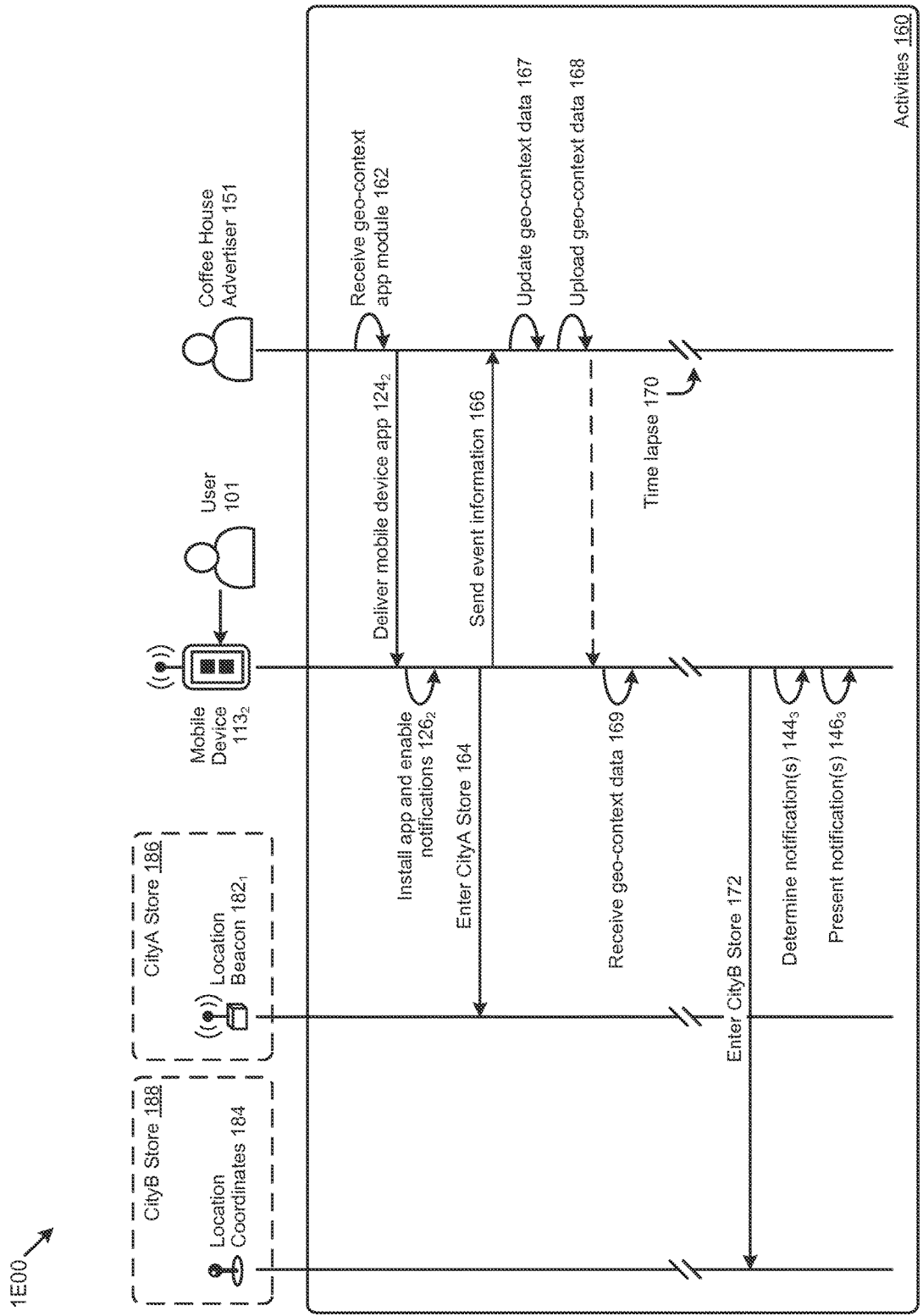
FIG. 1E presents a commercial environment that exemplifies a need for delivering geo-context information to a mobile device based on predicted user locations, according to an embodiment.

FIG. 1E presents a commercial environment 1E00 that exemplifies a need for delivering geo-context information to a mobile device based on predicted user locations. As an option, one or more instances of commercial environment 1E00 or any aspect thereof may be implemented in the context of the architecture and functionality of the embodiments described herein. Also, the commercial environment 1E00 or any aspect thereof may be implemented in any desired environment.

Specifically, as an example, commercial environment 1E00 depicts a coffee house advertiser 151 that has an interest in the location of a user 101 operating a mobile device $113_2$ relative to a store in city A (e.g., cityA store 186) and a store in city B (e.g., cityB store 188) owned by the coffee house advertiser 151. The cityA store 186 has a location beacon $182_1$ (e.g., UUID="Store186") that is uniquely associated with the cityA store "Store186". Further, the cityB store 188 is represented by a certain combination of location coordinates 184 (e.g., coordinates="40.014961, −105.252684") uniquely associated with cityB store 188. The location beacon $182_1$ and location coordinates 184 can assist in assessing the location of user 101 relative to the cityA store 186 and the cityB store 188, respectively. In one or more embodiments, the cityA store 186 can represent an initial location point and the cityB store 188 can represent a predicted location point as described as pertains to FIG. 1D.

In the depicted example of certain activities 160, the coffee house advertiser 151 can receive a geo-context app module (see operation 162) to incorporate into a mobile device app that is delivered to the user 101 (see message $124_2$). The user 101 can install the app on mobile device $113_2$ and enable notifications for the app (see operation $126_2$). When the user 101 enters cityA store 186 (see message 164) and is in range of the location beacon $182_1$, the information (e.g., UUID) received from the location beacon $182_1$ and other event information (e.g., dwell time, electronic purchases, etc.) can be sent to the coffee house advertiser 151 (see message 166). For example, the coffee house advertiser 151 might learn that the user 101 visited cityA store 186 at 09:00 am, stayed for 60 minutes, and purchased a medium latte. The coffee house advertiser 151 can use this information to create and update geo-context data associated with the user 101, the cityA store 186, and/or other advertising audience segmentations (see operation 167). For example, the coffee house advertiser 151 might create a latte coupon for user 101 that can be presented if user 101 enters another store owned by the coffee house advertiser 151. The updated geo-context data can then be uploaded (see operation 168), such that it can be received at the mobile device $113_2$ (see operation 169). For example, the data management server 111 in environment 1D00 can store and deliver such geo-context datasets corresponding to certain predicted location points (e.g., cityB store 188).

After a time lapse 170, the user 101 can enter the cityB store 188 (see message 172). The mobile device app and geo-context app module operating on the mobile device $113_2$ can detect (e.g., comparing GPS signals to the location coordinates 184) that the mobile device $113_2$ is now at the cityA store 186. The app can further use the uploaded geo-context data to determine what, if any, notifications can be presented to the user 101 (see operation $144_3$). For example, rules and/or triggers included in the geo-context data might indicate that the latte coupon be presented to the user 101 when the following conditions are satisfied: the user is at an associated store and the time is before noon. If the user 101 is visiting cityB store 188 at 09:23 am, then the conditions are satisfied and the latte coupon is presented to the user 101 (see operation $146_3$).

The commercial environment 1E00 is an example showing two points of interest associated with the coffee house advertiser 151 (e.g., cityA store 186 and cityB store 188). Other point of interest associated with the coffee house advertiser 151 are possible. For example, the coffee house advertiser 151 might have 2,000 stores nationwide. Further, the mobile device $113_2$ might operate apps from multiple advertisers each having multiple associated points of interest. In such cases, the location points associated with certain points of interest can be grouped according to various techniques. Embodiments of such techniques as used in systems for delivering geo-context information to a mobile device based on predicted user locations are described as pertains to FIG. 2A1, FIG. 2A2, FIG. 2A3, FIG. 2A4, FIG. 2B, FIG. 2C, and FIG. 2D.

FIG. 2A1, FIG. 2A2, FIG. 2A3 and FIG. 2A4 depict region boundaries defining sets of networked location points as used in systems for delivering geo-context information to a mobile device based on predicted user locations.

FIG. 2A1 illustrates certain location beacons and location coordinates near the mobile device $113_3$. In some embodiments, each location point can be described using data values conforming to a geographic coding language such as GeoJSON. For example, a location point located in San Francisco, Calif. might be described in GeoJSON with the following key-value pairs respectively describing a store name, the store location coordinates, and a physical geo-fence surrounding the store: "locationID:Store11495", "coordinates:37.782841, −122.464014", and "radius:10". Other key-value pairs to describe location points are possible. As shown in FIG. 2A1, and indicated in the above example, a circular region with a certain radius is one technique for referring to one or more location points. Various approaches for defining the radius and associated region boundary are possible. For example, one approach entails setting the physical location of the user of mobile device $113_3$ as the center of a circle, and setting an initial predicted radius $202_1$ (e.g., 10 miles) as a boundary. In this approach, as the user and the mobile device $113_3$ change position, location points entering and leaving the circular region defined by initial predicted radius $202_1$ can be added and discarded, respectively, from the collection of location points being considered.

A notification boundary can be defined or characterized by a density value or a count value. For example, if an initial predicted radius is set to five miles and the user is in New York City, the number of coffee houses in the circular region defined by the initial predicted radius can change and be updated as the user walks around and coffee house location points enter and leave the circular region. In this example, if the specified maximum count is set to 10 coffee houses, then the closest 10 coffee houses might be bounded by a circular region having a notification radius $204_1$ of only a mile or so.

In a rural area, however, such as depicted in FIG. 2A2, an initial predicted radius $202_2$ of five miles might not yield any relevant location points. An alternative approach can define a notification radius $204_2$, where a specified maximum number of closest location points defines the size of the region. For example, if the specified maximum is set to 5 coffee houses, and the user is in a rural area, then the closest 20 coffee houses might define a circular region having a notification radius $204_2$ of 20 miles. In this case, the coffee house that is farthest from the user and mobile device $113_3$ sets the magnitude of the notification radius.

A notification area can be defined by a radius (e.g., for a circular area), or it can be defined by any shape. FIG. 2A3 depicts a notification area comprising a notification region having an oblong shape such as the shown notification region shape $206_1$.

Figure 4:
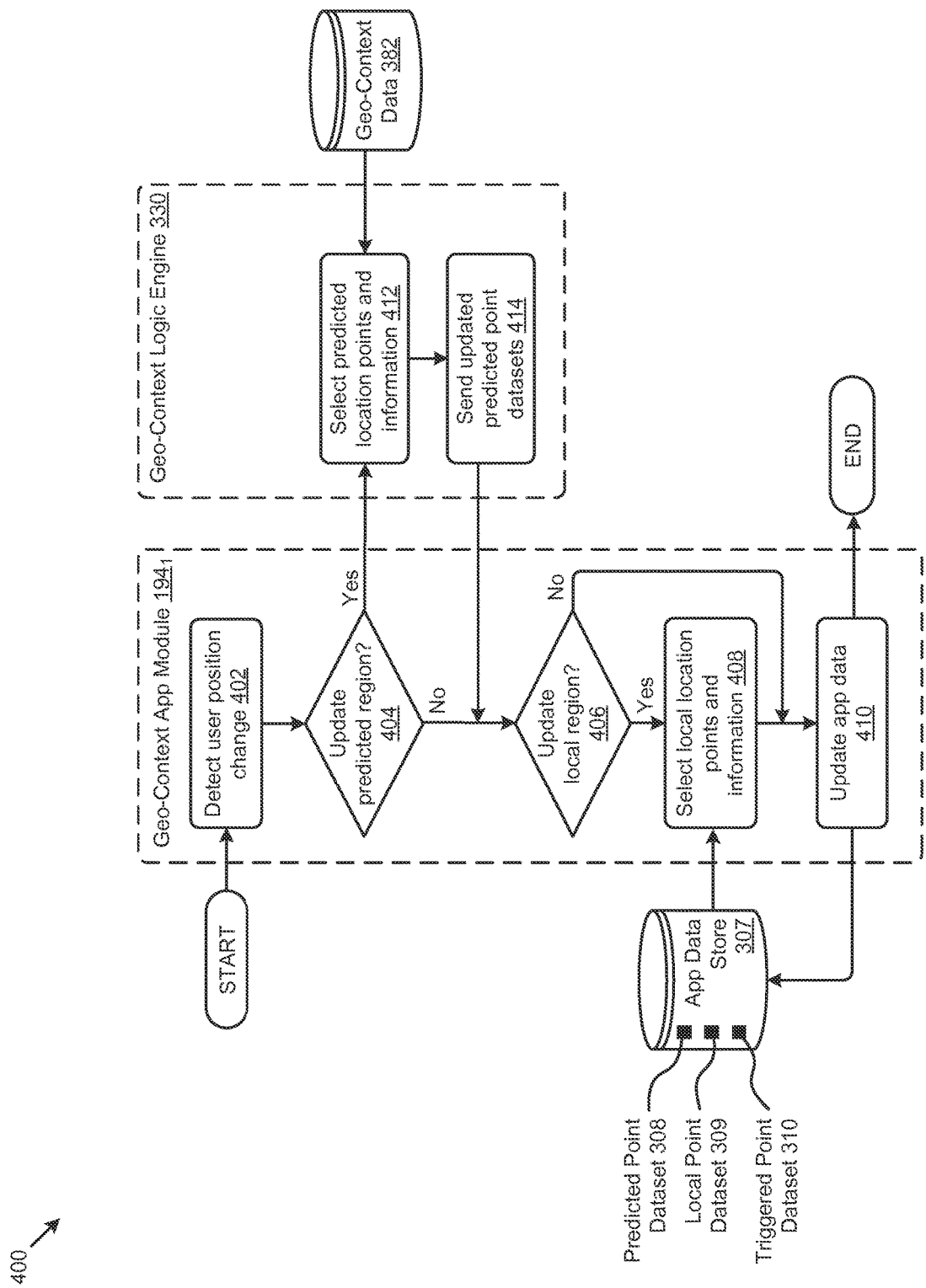

In still other embodiments, such as shown in FIG. 2A4, a notification area can be defined by notification region that pertains to a prediction based on direction of travel. FIG. 2A4 depicts a notification area comprising a notification region, having an oblong shape that is defined in part by the direction of travel of the user (e.g., the notification region shape $206_2$). Various embodiments predict a notification region (e.g., size and shape) based on any one or more (or combinations of) a first location, a second location, the direction of travel between a first location and a second location, the speed of travel, traffic conditions, time of day, user preferences and/or history (e.g., user selected options, user specified preferences, implied or explicit user likes or dislikes, etc.). Further, the size and shape of a predicted notification region can be based on the geographic density of candidate beacons or other notification sources. Still further, the size and shape of a predicted notification region can be based on limitations of the user device. For example, if the user device has only a limited amount of memory to hold notifications, then the predicted notification region can be sized so as to honor such a limit. A user device storage limit (e.g., memory size limitation, number or rate of notification limitations, etc.) as well as other limits can be configured by a user or an administrator.

Figure 2B:
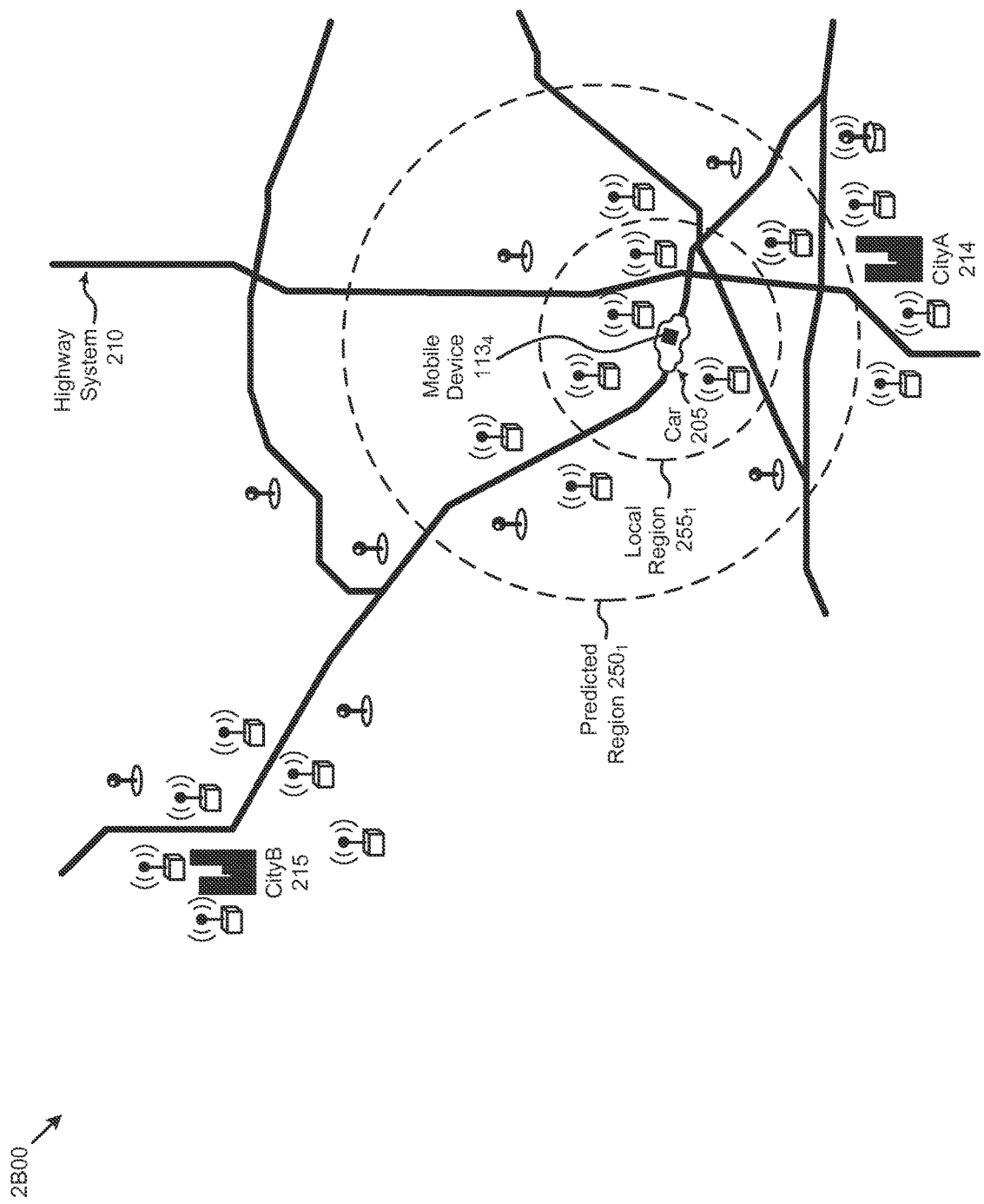
FIG. 2B presents an initial location map showing networked location points corresponding to a first location as used in systems for delivering geo-context information to a mobile device based on predicted user locations, according to an embodiment.
Figure 3:
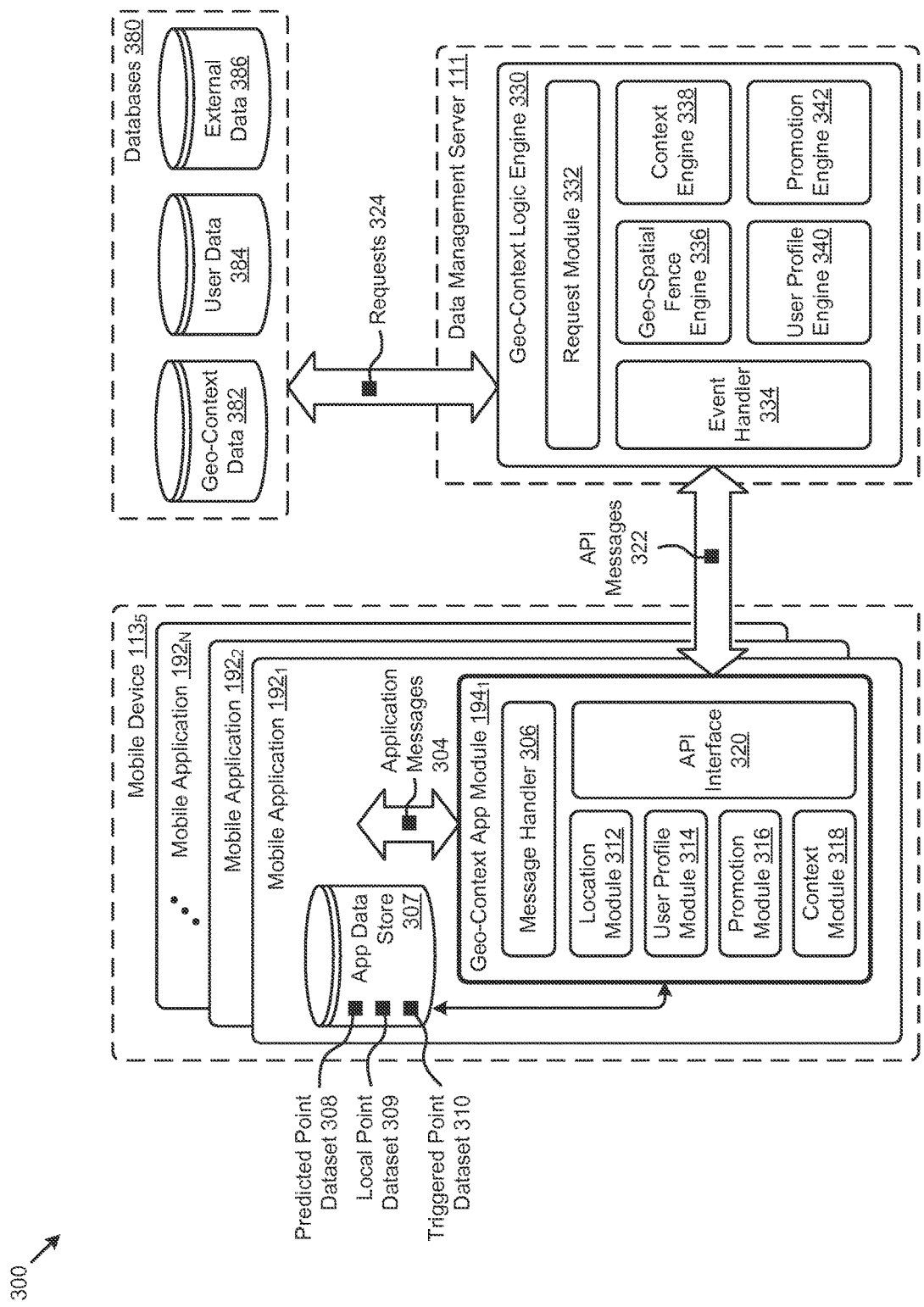

FIG. 2B presents an initial location map 2B00 showing networked location points corresponding to a first location as used in systems for delivering geo-context information to a mobile device based on predicted user locations. As an option, one or more instances of initial location map 2B00 or any aspect thereof may be implemented in the context of the architecture and functionality of the embodiments described herein. Also, the initial location map 2B00 or any aspect thereof may be implemented in any desired environment.

The initial location map 2B00 shows an environment having various location points in a geographic area comprising a CityA 214 and a CityB 215. In particular, the initial location map 2B00 illustrates certain location beacons and location coordinates near a car 205 driven by a user and traveling on a highway system 210 from CityA 214 to CityB 215. As an example, the car 205 might be carrying a mobile device $113_4$ (e.g., user smartphone, car on-board mobile technology, etc.) that can determine proximity to one or more location points. Specifically, the mobile device $113_4$ can comprise network sensors 190, and can operate any instances of mobile applications 192 and/or geo-context app modules 194 as described in environment 1D00. As shown, a local region $255_1$ centered on car 205 and having a certain radius (e.g., initial predicted radius, notification radius, etc.) can comprise various location points. For example, the location points in local region $255_1$ can represent the maximum number of actively tracked location points allowed by the operating system of mobile device $113_4$ (e.g., 20). In some embodiments, such local location points can further become triggered location points when certain geo-context conditions (e.g., rules, triggers, etc.) are met and associated notifications are presented to a user. Also shown in the initial location map 2B00 is a predicted region $250_1$ comprising location points that are in addition to the location points in the local region $255_1$. For example, according to the herein disclosed techniques, the predicted region $250_1$ can include predicted location points that can have associated geo-context information that can be locally stored and used by the mobile device $113_4$ to overcome the limitations of the mobile device $113_4$ (e.g., operating system region tracking limits).

Figure 2C:
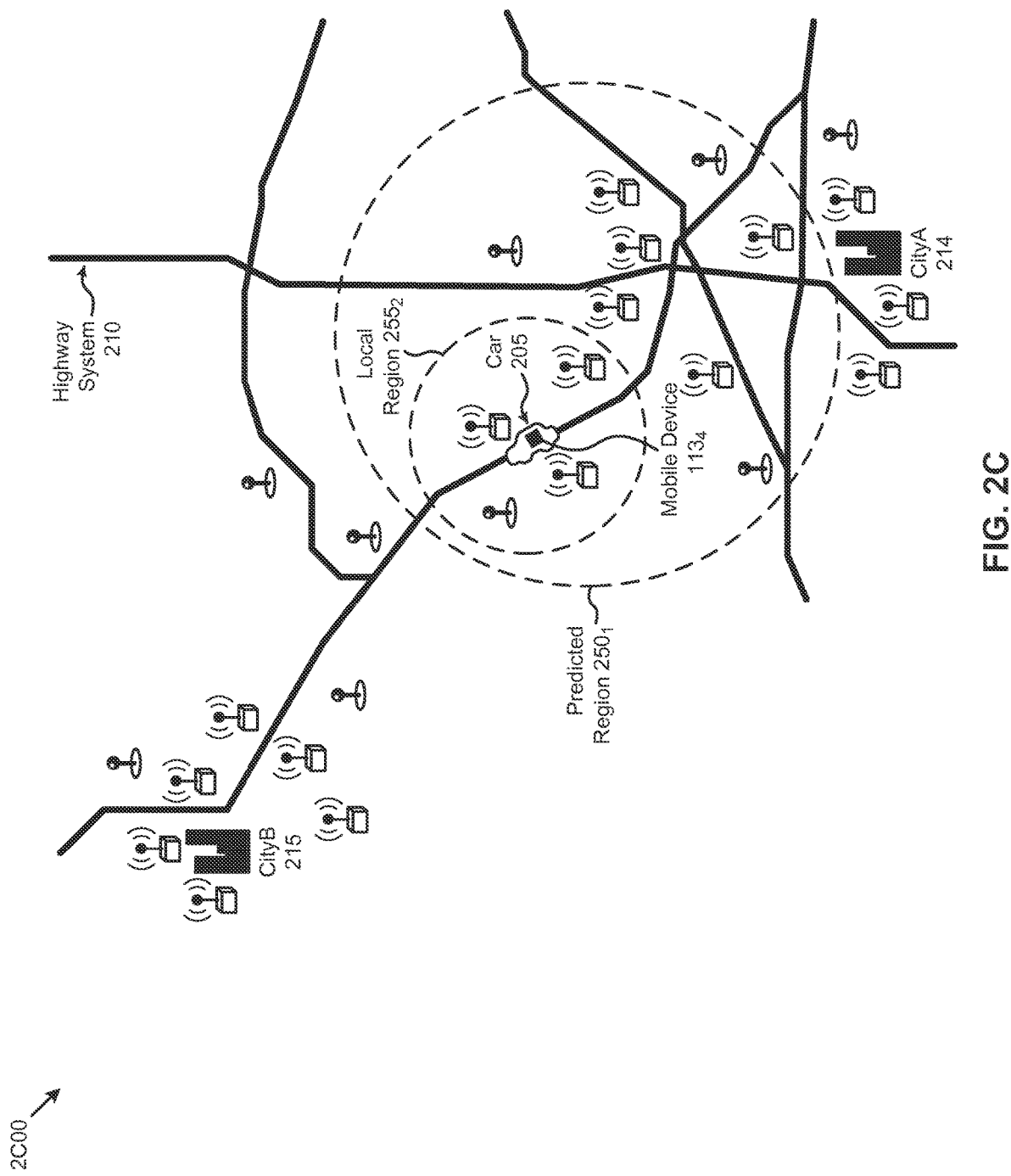
FIG. 2C presents an intermediate location map showing networked location points corresponding to a second location as used in systems for delivering geo-context information to a mobile device based on predicted user locations, according to an embodiment.

FIG. 2C presents an intermediate location map 2C00 showing networked location points corresponding to a second location as used in systems for delivering geo-context information to a mobile device based on predicted user locations. As an option, one or more instances of intermediate location map 2C00 or any aspect thereof may be implemented in the context of the architecture and functionality of the embodiments described herein. Also, the intermediate location map 2C00 or any aspect thereof may be implemented in any desired environment.

The intermediate location map 2C00 depicts the car 205 from FIG. 2B at an intermediate position as the car 205 travels towards CityB 215 along a highway route (e.g., along the highway system 210). As shown, the location points nearest the car 205 now comprise a local region $255_2$, yet the predicted region $250_1$ remains as described in the initial location map 2B00. In this case, according to the herein disclosed techniques, the local region $255_2$ can be generated from the location points (e.g., predicted location points) included in predicted region $250_1$ stored locally on the mobile device $113_4$. More specifically, for example, the local region $255_2$ can be generated by the mobile device $113_4$ (e.g., executing one or more instances of the mobile applications 192 using geo-context app modules 194) without accessing a remote server to upload more location points and associated datasets, conserving bandwidth, battery power, and other computing resources.

Figure 2D:
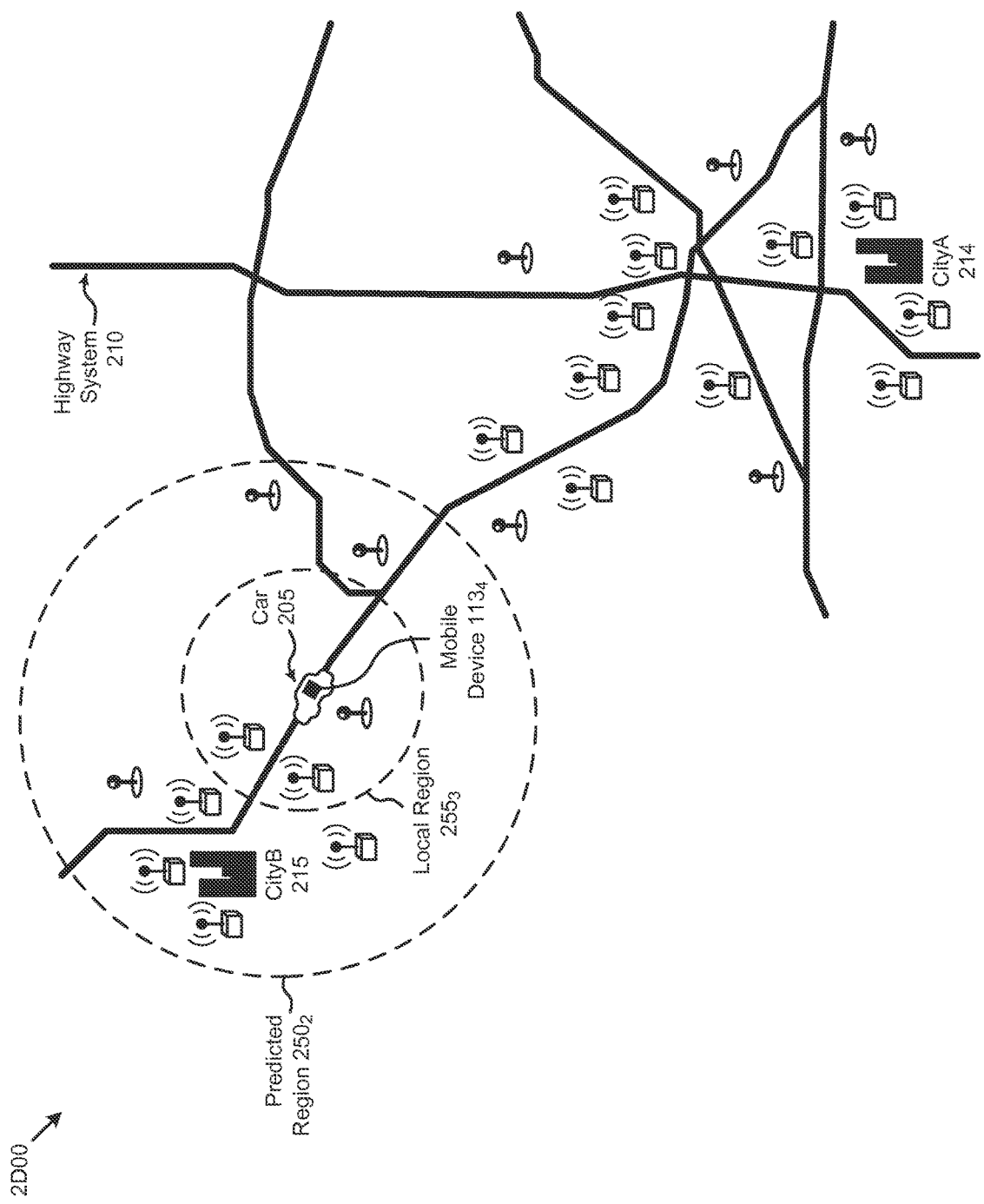
FIG. 2D presents a waypoint location map showing networked location points corresponding to a third location as used in systems for delivering geo-context information to a mobile device based on predicted user locations, according to an embodiment.

FIG. 2D presents a waypoint location map 2D00 showing networked location points corresponding to a third location as used in systems for delivering geo-context information to a mobile device based on predicted user locations. As an option, one or more instances of waypoint location map 2D00 or any aspect thereof may be implemented in the context of the architecture and functionality of the embodiments described herein. Also, the waypoint location map 2D00 or any aspect thereof may be implemented in any desired environment.

The waypoint location map 2D00 depicts the car 205 from FIG. 2B and FIG. 2C at a waypoint position as the car 205 travels towards CityB 215 along the highway system 210. As shown, the location points nearest the car 205 now comprise a local region $255_3$, and additional location points (e.g., predicted location points) outside the local region $255_3$ define a predicted region $250_2$. For example, referring also to the intermediate location map 2C00, as the car 205 crosses the boundary of predicted region $250_1$, logic in a mobile app operating at the mobile device $113_4$ might invoke a request (e.g., API message to data management server 111) for more predicted location points and associated datasets defining the predicted region $250_2$ to be pushed to the mobile device $113_4$.

One advantage of the techniques as shown in the embodiments described as pertains to FIG. 2B, FIG. 2C, and FIG. 2D is that while the maximum number of active location points in a given local region (e.g., local region $255_1$, local region $255_2$, and local region $255_3$) may be limited by the operating system of the mobile device $113_4$, the maximum number of points in the predicted regions (e.g., predicted region $250_1$, predicted region $250_2$) can be specified according to the full capabilities of the mobile applications 192. For example, given a coffee house having 3,000 locations nationwide, a certain local region might comprise the 20 coffee houses located nearest to the user of mobile device $113_4$, while an associated predicted region might comprise 200 coffee houses located nearest to the user of a different instance of mobile device $113_4$. In this example, a mobile app designer can use an instance of the geo-context app modules 194 to scale the number of location points (e.g., stores, or zones within a store) to maximize the utility of one or more mobile applications 192, effectively working around the limitations of the operating system of the mobile device $113_4$. One embodiment of a system for implementing such herein disclosed techniques for delivering geo-context information to a mobile device based on predicted user locations is described as pertains to FIG. 3.

FIG. 3 is a block diagram of a system 300 for delivering geo-context information to a mobile device based on predicted user locations. As an option, one or more instances of system 300 or any aspect thereof may be implemented in the context of the architecture and functionality of the embodiments described herein. Also, the system 300 or any aspect thereof may be implemented in any desired environment.

The system shown in FIG. 3 presents an example embodiment of various modules for operating the herein disclosed techniques on a mobile device $113_5$ while in communication with the data management server 111 from environment 1D00. The data management server 111 further comprises a geo-context logic engine 330 that has access to certain databases 380 (e.g., geo-context data 382, user data 384, and external data 386). The mobile device $113_5$ can also operate one or more mobile applications (e.g., mobile application $192_1$, mobile application $192_2$, . . . , mobile application $192_N$) that can have a local app storage facility and access to various integrated and/or external software modules. Specifically, mobile application $192_1$ is shown having an app data store 307 and access to a geo-context app module $194_1$. The geo-context app module $194_1$ can be a module separate from the mobile application $192_1$ (e.g., delivered as an SDK from a data management provider) integrated into the mobile application $192_1$, or the geo-context app module $194_1$ can be implemented using other possible approaches. The mobile application $192_1$ can communicate with the geo-context app module $194_1$ through application messages 304 received and sent by the geo-context app module $194_1$ through a message handler 306.

The geo-context app module $194_1$ can use the app data store 307 to locally store and access various data used in implementing the herein disclosed techniques. For example, one or more instances of a predicted point dataset 308 can store the predicted location points (e.g., comprising a predicted region) and associated information (e.g., location beacon UUID, location coordinates, rules, triggers, notification content, notification status, etc.). Further, one or more instances of a local point dataset 309 can store the local location points (e.g., comprising a local region) and associated information (e.g., location beacon UUID, location coordinates, rules, triggers, notification content, notification status, etc.). Also, one or more instances of a triggered point dataset 310 can store the triggered or "active" location points (e.g., location points that have triggered one or more notifications) and associated information (e.g., location beacon UUID, location coordinates, rules, triggers, notification content, notification status, etc.).

The geo-context app module $194_1$ further comprises a location module 312, a user profile module 314, a promotion module 316, and a context module 318. The location module 312 manages location information (e.g., location beacon signals, GPS signals, etc.) received by the mobile device $113_5$ (e.g., through an instance of the network sensors 190). Such location information can be used by the geo-context app module $194_1$ and/or forwarded to the geo-context logic engine 330 at the data management server 111 for various geo-context processing according to the herein disclosed techniques. The user profile module 314 can process information specific to the user of mobile device $113_5$ to be used in determining notifications. Such user information includes the user's preferences, browsing activities, geographic location history, point-of-sale transactions, and other information. The promotion module 316 can generate parameters (e.g., X % off item Y) for determining promotional notifications. Such promotional parameters can be based at least in part on user profile information and the various datasets stored in the app data store 307. The context module 318 can process context information (e.g., outside temperature, time of day, etc.) to be used in determining notifications. One or more geo-context app modules in the mobile device $113_5$ can work independently or in concert to send or collect data or produce geo-context notifications that can be sent to the mobile application $192_1$ and presented to the user of mobile device $113_5$.

In some cases, the geo-context app module $194_1$ can use an API interface 320 to communicate with the geo-context logic engine 330 at the data management server 111. Specifically, the API interface 320 can send and receive API messages 322 to and from, respectively, an event handler 334 in the geo-context logic engine 330. For example, the geo-context app module $194_1$ might request an updated instance of the predicted point dataset 308 from the geo-context logic engine 330 when one or more events have occurred (e.g., a predicted region boundary has been crossed). More specifically, the event handler 334 can process the API messages 322 (e.g., dataset request, processing request, etc.) and route them to and from a plurality of processing engines (e.g., a geo-spatial fence engine 336, a context engine 338, a user profile engine 340, a promotion engine 342, etc.). The plurality of processing engines can also use a request module 332 to send requests 324 (e.g., SQL query, API call, etc.) for information to the databases 380 to be used in processing various operations according to the herein disclosed techniques. The plurality of processing engines comprising the geo-context logic engine 330 can work independently or in concert to perform such operations.

More specifically, the geo-spatial fence engine 336 processes requests for location points such as a request for an update to predicted location points comprising a predicted region. For example, a change in location of the mobile device $113_5$ might invoke a request for the geo-spatial fence engine 336 to access the geo-context data 382 and retrieve new location points comprising a new predicted region. The geo-spatial fence engine 336 can use various techniques (e.g., using an initial predicted radius, using a notification radius, etc.) to determine the requested location points and associated region. The geo-spatial fence engine 336 might further access the geo-context data 382 to retrieve data to include in one or more location point datasets to be pushed to the mobile device $113_5$. In one or more embodiments, the geo-context data 382 is capable of storing all the location points and associated data for one or more data clients (e.g., companies, advertisers, etc.). For example, if a coffee house has 3,000 locations, 3,000 corresponding location points and associated datasets can be stored in the geo-context data 382.

The promotion engine 342 processes promotions (e.g., notifications, coupons, etc.) that can be sent to the geo-context app module $194_1$ for presentation on the mobile device $113_5$. For example, the promotion engine 342 might access the geo-context data 382 to retrieve notification information (e.g., notification HTML content, location-specific parameters, etc.) associated with a given triggered location point. As earlier discussed, such notification information can be uploaded to the data management server 111 and corresponding geo-context data 382 database by a mobile advertiser. The context engine 338 processes requests for context information—such as the weather—at the user's current geographic location. For example, the context engine 338 might send an API call to retrieve information pertaining to the weather at the user location (e.g., El Paso, Tex.) from the external data 386 (e.g., a weather website) and determine that the current temperature is 105 degrees Fahrenheit. The geo-context logic engine 330 may then use this information to send a geo-context notification relevant to the user's environment such as a coupon for an iced coffee. As another example, if the user is a tea-drinker and located in Winnemucca, Nev., and the context engine 338 has retrieved data to indicate it is currently 20 degrees Fahrenheit at the user's location, the geo-context logic engine 330 may then generate and send a coupon for a hot tea (e.g., as compared to a coupon for an iced coffee).

The user profile engine 340 processes requests for user data (e.g., user preferences, transaction history, demographics, etc.) to be used in determining specific notifications to be pushed to the mobile device $113_5$. For example, the user profile engine 340 might send an SQL query to retrieve a certain user's previous purchase history and associated preference categories from the user data 384, and use the preference categories to determine an appropriate notification to present. For example, if the user likes coffee and dislikes tea, data representing that preference can be retrieved from the user data 384 and used by the geo-context logic engine 330 to send the user a geo-context notification such as "10% off lattes at the Coffee House". As a further example, the user preference data retrieved from the user data 384 can be combined with location point dataset information retrieved from geo-context data 382 to create a more targeted geo-context notification such as, "10% off lattes at the Coffee House, located at the intersection of Stevens Creek Blvd. and De Anza Blvd." The information stored in the user data 384 may be collected from a variety of sources such as user-specific settings of mobile application 192$_1$, point-of-sale transaction information, browser habits, the frequency that the user passes by a given store, the length of time that a user stands in front of a product in a retail store, and/or other information.

FIG. 4 presents a geo-context information update technique 400 as used in systems for delivering geo-context information to a mobile device based on predicted user locations. As an option, one or more instances of geo-context information update technique 400 or any aspect thereof may be implemented in the context of the architecture and functionality of the embodiments described herein. Also, the geo-context information update technique 400 or any aspect thereof may be implemented in any desired environment.

The geo-context information update technique 400 presents one embodiment of certain steps for updating geo-context information on a mobile device in systems for delivering geo-context information to a mobile device based on predicted user locations. In one or more embodiments, the steps and underlying operations comprising the geo-context information update technique 400 can be executed by the geo-context app module 194$_1$ and the geo-context logic engine 330 of system 300. The app data store 307 and the geo-context data 382 from system 300 are also shown for reference. Specifically, the geo-context information update technique 400 starts with the geo-context app module 194$_1$ detecting a user position change (see step 402). In some embodiments, for example, when the user's position changes or the user's position traverses a boundary or the user's position exceeds a range (e.g., at region boundary crossings, or at distance threshold crossings, or based upon location point range entries, etc.) calculations can be performed so as to adjust a predicted region and/or adjust a notification area. Further such user position changes can invoke the geo-context information update technique 400, the results from which can be stored as rules and/or triggers in the app data store 307. If the position change requires an update to the current predicted region (see decision 404), then a message is sent to the geo-context logic engine 330 to select new predicted location points and associated information (see step 412). For example, the location module 312 of the geo-context app module 194$_1$ might receive a signal indicating the mobile device operating the geo-context app module 194$_1$ has crossed a predicted region boundary, and that a new predicted region be generated. The new predicted location points can be selected from certain location points (e.g., all location points of mobile advertisers using the geo-context app modules 194) stored in the geo-context data 382. For example, the geo-spatial fence engine 336 of the geo-context logic engine 330 can use various techniques to select the new location points comprising the new predicted region. The geo-spatial fence engine 336 might further access the geo-context data 382 to retrieve data to include in the associated predicted point datasets to be sent to the geo-context app module 194$_1$ (see step 414). For example, the data included in the datasets can comprise various information provided by mobile advertisers and associated with respective location points such as notification rules and triggers, notification HTML content, location-specific parameters, and other information. The aforementioned associated predicted point datasets can comprise local information, and the local information can be used in the course of generating notifications. Such notifications can be determined based on one or more local rules, or one or more local triggers, or local promotional data, or local context data, or any combination thereof.

The geo-context information update technique 400 continues at the geo-context app module 194$_1$ by checking whether an update to a local region is required (see decision 406). If an update is required, the geo-context app module 194$_1$ can use the updated predicted point datasets pushed from the geo-context logic engine 330 and/or one or more instances of the predicted point dataset 308 currently in the app data store 307 to select the local location points and associated information that can comprise an updated local region (see step 408). For example, the change in user position might require an update of the local region, yet not require an update of the predicted region (e.g., see FIG. 2C). As another example, the change in user position might require both an update of the local region and an update of the predicted region (e.g., see FIG. 2D). In one or more embodiments, the location points comprising the predicted region include the location points comprising the local region. The geo-context app module 194$_1$ can use various techniques to select the location points comprising the updated local region. In some cases, the geo-context app module 194$_1$ can consider mobile device operating system constraints (e.g., a 20-location point tracking maximum) when selecting the location points comprising the updated local region. When the appropriate predicted regions and/or local regions have been updated, the associated updated data can be stored in the app data store 307 (see step 410). Other flows for updating geo-context information are possible—such as the local region—and can be updated prior to the predicted region being updated, and/or the local region and/or predicted region can be updated according to a temporal schedule, and other possible flows can be envisioned.

Figure 5A:
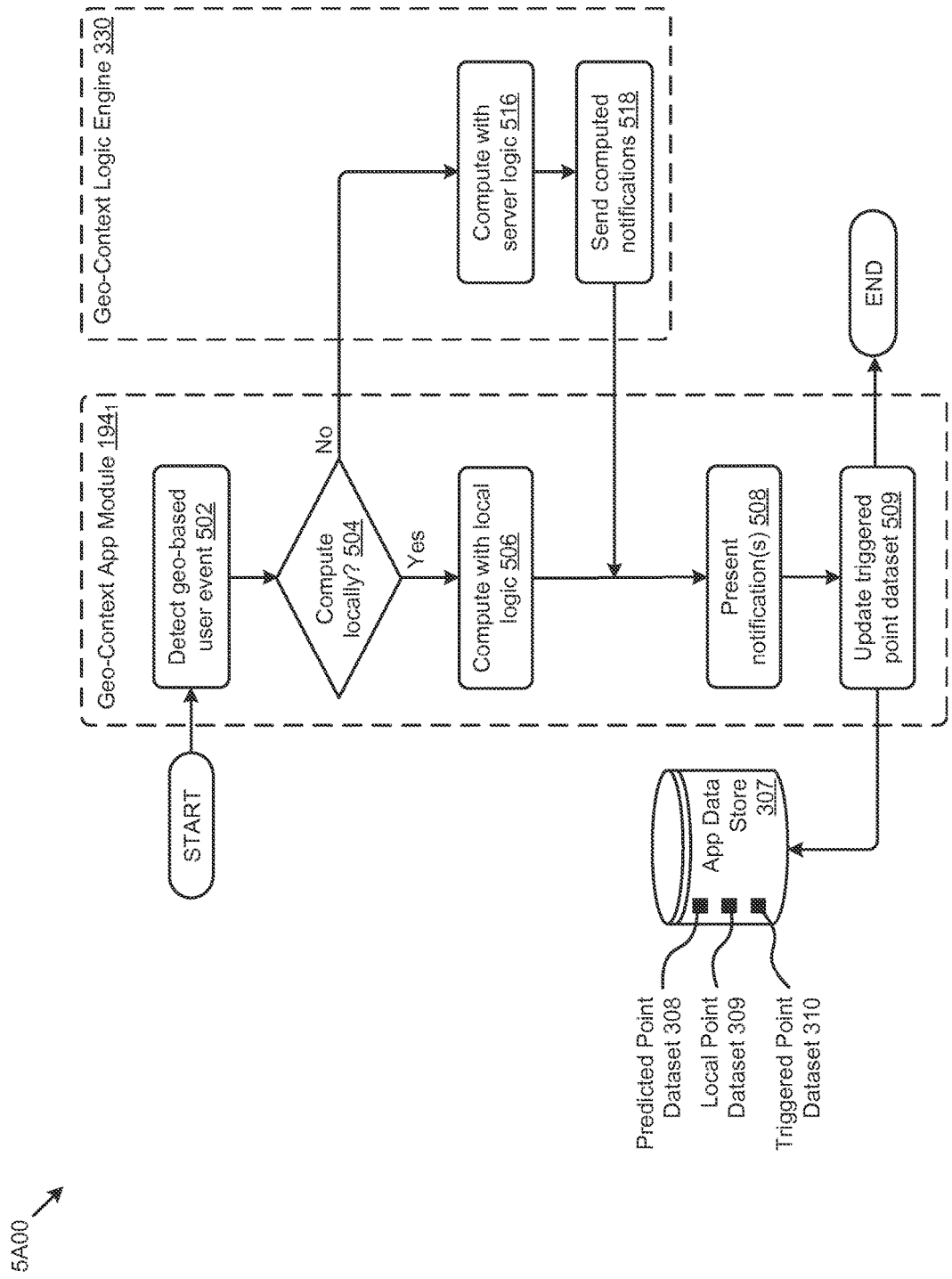
FIG. 5A is a flow diagram for providing geo-context notifications in systems for delivering geo-context information to a mobile device based on predicted user locations, according to an embodiment.

FIG. 5A is a flow diagram 5A00 for providing geo-context notifications in systems for delivering geo-context information to a mobile device based on predicted user locations. As an option, one or more instances of flow diagram 5A00 or any aspect thereof may be implemented in the context of the architecture and functionality of the embodiments described herein. Also, the flow diagram 5A00 or any aspect thereof may be implemented in any desired environment.

The flow is one embodiment of certain steps for providing geo-context notifications on a mobile device in systems for delivering geo-context information to a mobile device based on predicted user locations. In one or more embodiments, the steps and underlying operations comprising the flow can be executed by the geo-context app module 194$_1$ and the geo-context logic engine 330 of system 300. The app data store 307 from system 300 is also shown for reference. Specifically, the flow starts with the geo-context app module 194$_1$ detecting a geo-based user event (see step 502). In some embodiments, for example, the geo-based user event might be triggered when a user carrying a mobile device operating the geo-context app module 194$_1$ enters a particular store, comes into range of a particular store, comes into range of a certain section of the store, opens an app associated with the store, and/or other events. In such cases, the attributes associated with the user event can be used to determine one or more notifications to be presented. The flow can then proceed using local resources (e.g., mobile device 113$_5$) or server resources (e.g., data management server 111) for determining geo-context notifications. For example, if the information required to compute (e.g., select, compose, etc.) one or more notifications is stored locally (e.g., in the datasets stored in the app data store 307), then locally-computed notifications can be determined (see decision 504) using local resources and logic (see step 506) and presented to the user (see step 508). If computing one or more notifications at the server is desired (e.g., to include additional data from databases 380), then the computed notifications can be computed using server resources and logic (see step 516), sent to the geo-context app module $194_1$ (see step 518), and presented to the user (see step 508). For each notification presented, the geo-context app module $194_1$ can then update the respective instance of the triggered point dataset 310 in app data store 307 (see step 509). For example, an updated instance of the triggered point dataset might be updated to change "Ice coffee ahead in 2 miles" to "Ice coffee ahead in one mile". A technique for computing the geo-context notifications locally and/or at the server is described as pertains to FIG. 5B.

Figure 5B:
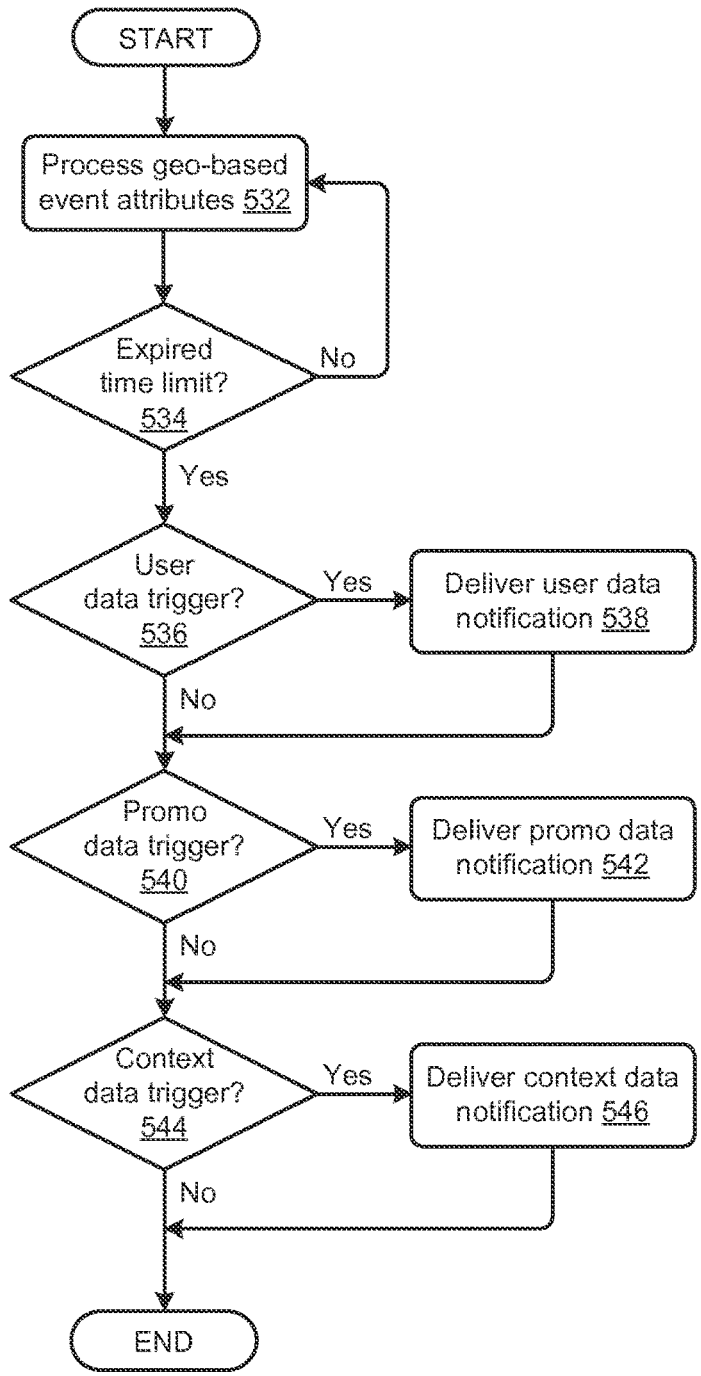
FIG. 5B depicts a geo-context notification computing technique as used in systems for delivering geo-context information to a mobile device based on predicted user locations, according to an embodiment.

FIG. 5B depicts a geo-context notification computing technique 5B00 as used in systems for delivering geo-context information to a mobile device based on predicted user locations. As an option, one or more instances of geo-context notification computing technique 5B00 or any aspect thereof may be implemented in the context of the architecture and functionality of the embodiments described herein. Also, the geo-context notification computing technique 5B00 or any aspect thereof may be implemented in any desired environment.

The geo-context notification computing technique 5B00 is one embodiment of certain steps for computing geo-context notifications in systems for delivering geo-context information to a mobile device based on predicted user locations. In one or more embodiments, the geo-context notification computing technique 5B00 can be used to compute notifications with local logic (e.g., on mobile device $113_5$), and/or compute notifications with server logic (e.g., at data management server 111), according to the flow (see step 506 and step 516, respectively). Specifically, geo-context notification computing technique 5B00 can begin with receiving and processing geo-based event attributes (see step 532). For example, a user with a mobile device entering a particular coffee house might detect a location beacon UUID attribute that identifies the coffee house store number and/or location. The event attributes can be analyzed to determine whether enough time has transpired since the user was last sent a related notification (see decision 534). For example, an app may set a time limit so that a given user is only sent promotions no more than twice a week. In this case, the user is not inundated with promotions every time a geo-based user event occurs. If the time limit has not expired then it is too soon to send a geo-based promotion and the user event can be ignored. If the time limit is expired, the user may be sent one or more notifications, and the process continues to check various triggers and associated data to determine such notifications.

Specifically, user data can be checked to determine if an associated user data notification can be delivered (see decision 536). Such user data can be retrieved locally (e.g., from datasets and/or other data in app data store 307) and/or from one or more servers (e.g., from user data 384). For example, if the geo-based event indicates the user has passed by a certain coffee house and the user data indicates the user is a coffee drinker, then the user data may trigger a user data notification (e.g., a coupon for coffee) to be delivered (see step 538). In some cases, the user data may not trigger a notification to be delivered. Also, promotional data can be checked to determine if an associated promotional data notification can be delivered (see decision 540). Such promotional data can be retrieved locally (e.g., from datasets and/or other data in app data store 307) and/or from one or more servers (e.g., from geo-context data 382). For example, if a company has storewide coupons that can be used in any store, then the promotional data may trigger a promotional data notification (e.g., 10% off entire purchase) to be delivered when the user comes into range of any particular store (see step 542). In some cases, the promotional data may not trigger a notification to be delivered. Further, context data can be checked to determine if an associated context data notification can be delivered (see decision 544). Such context data can be retrieved locally (e.g., from datasets and/or other data in app data store 307) and/or from one or more servers (e.g., from external data 386). For example, if the user is in Amarillo, Tex. and the outside temperature is 100 degrees Fahrenheit, then a context data notification (e.g., an advertisement and/or a coupon for an iced tea) can be delivered to the user (see step 546). In some cases, context data may include various computed parameters such as the amount of time a given user spends in a certain area of the store, the frequency a user visits certain areas of the store, and other computed parameters. For example, if a user visits a particular retail store several times a week and has spent most of the time in the appliance aisle, a coupon for discounts on selected refrigerators can be delivered to encourage a purchase.

The trigger processing order shown in geo-context notification computing technique 5B00 is merely one embodiment and other processing orders are possible. Further, in other embodiments, multiple notifications may be delivered based in part on the various data triggers as shown, or only one notification may be delivered based in part on the various data triggers.

ADDITIONAL EMBODIMENTS OF THE DISCLOSURE

Additional Practical Application Examples

Figure 6A:
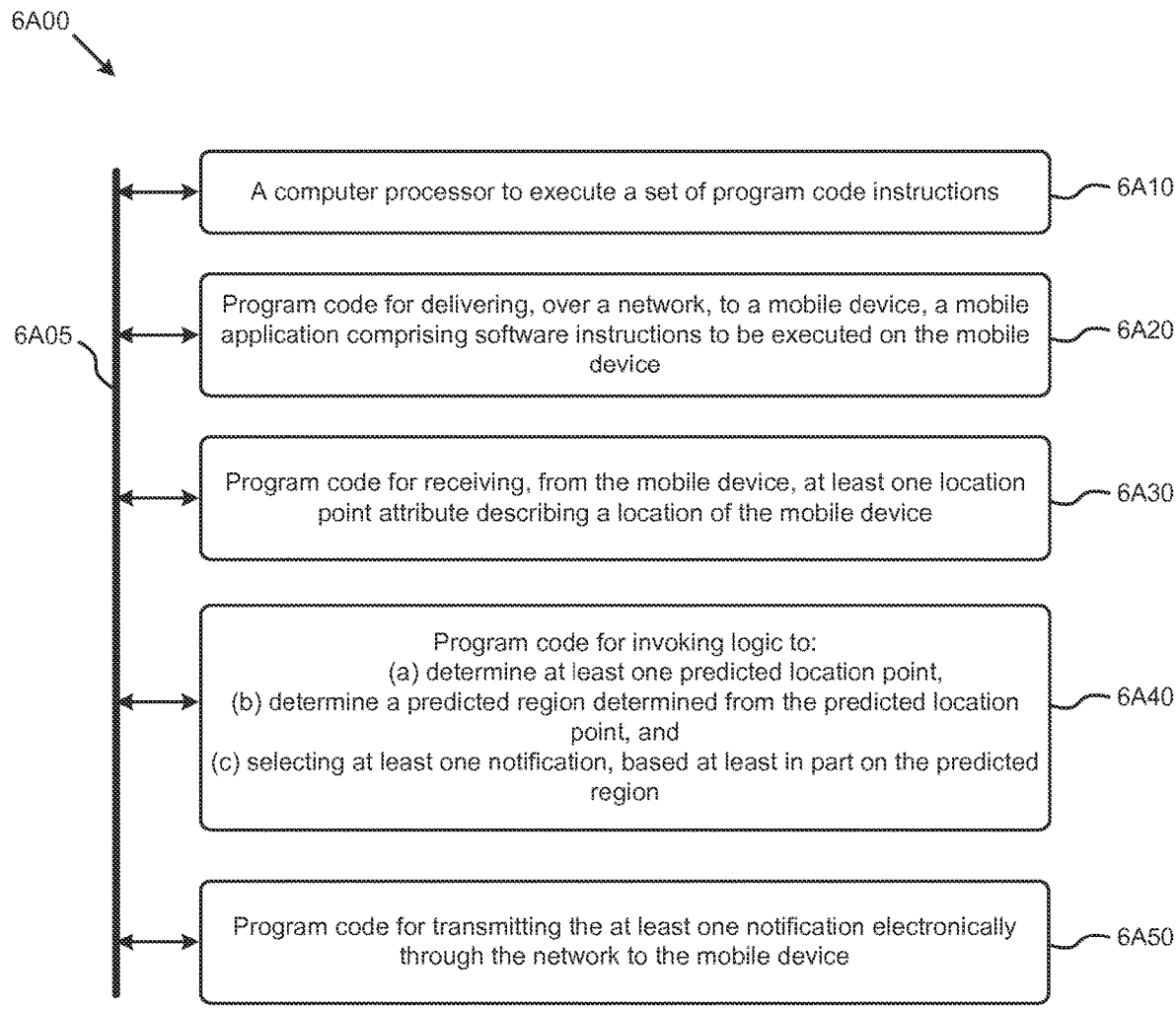
FIG. 6A and FIG. 6B depict systems as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the present system 6A00 may be implemented in the context of the architecture and functionality of the embodiments described herein. Of course, however, the system 6A00 or any operation therein may be carried out in any desired environment.

This embodiment commences when a software download server communicates to a mobile device to deliver a mobile application to that mobile device. Software instructions of the mobile application are executed on the mobile device. Then, responsive to operations of the software instructions on the mobile device, the mobile device sends messages comprising location data such as GPS data or other location point attributes. The same or a different server (referred to herein as "server") receives the location data describing the location of the mobile device and executes logic, such as logic defined by the software instructions, to determine predicted location points (e.g., based on speed, direction, mode of transportation, etc.), which are in turn used to determine predicted regions (e.g., a region within a notification radius) or predicted areas (e.g., a region formed by a notification shape that bounds the predicted location points). The server selects geo-specific notifications (e.g., advertisements, coupons, etc.), based at least in part on the predicted region, and transmits the geo-specific notifications electronically through the network to the mobile device. The geo-specific notifications are determined based on rules, triggers, geo-specific user data, geo-specific promotional data, and/or geo-specific context data.

As shown, the system 6A00 comprises a processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: delivering, over a network, to a mobile device, a mobile application comprising software instructions to be executed on the mobile device (see module 6A20); responsive to operations of a first portion of the software instructions, receiving at least one location point attribute describing a location of the mobile device (see module 6A30); invoking logic to (a) determine at least one predicted location point, (b) determine a predicted region determined from the predicted location point, and (c) selecting at least one notification, based at least in part on the predicted region (see module 6A40); and transmitting the at least one notification electronically through the network to the mobile device (see module 6A50).

Figure 6B:
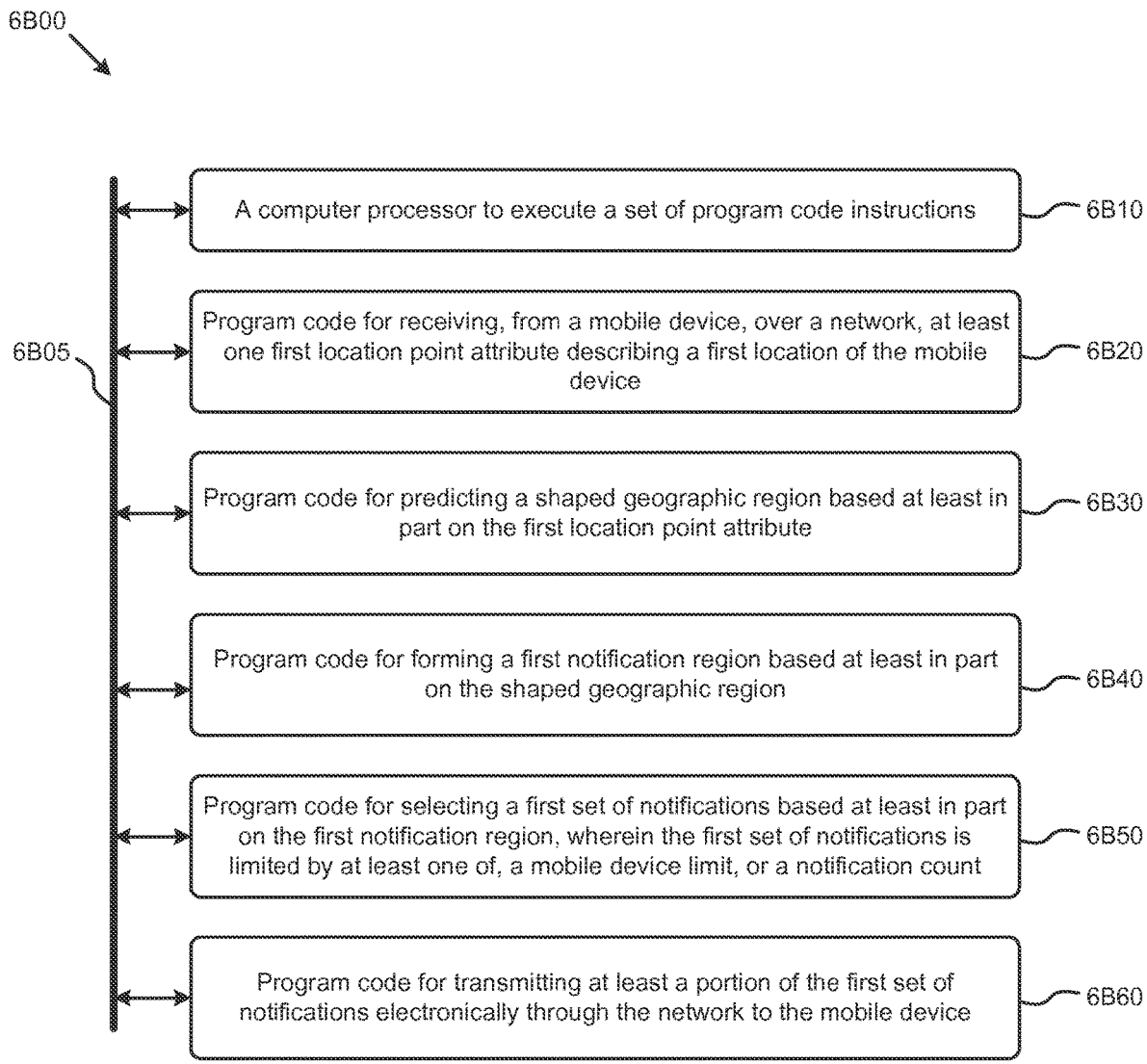

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the present system 6B00 may be implemented in the context of the architecture and functionality of the embodiments described herein. Of course, however, the system 6B00 or any operation therein may be carried out in any desired environment. As shown, the system 6B00 comprises a processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (see module 6B 10) and modules for accessing memory to hold program code instructions to perform: receiving, from a mobile device, over a network, at least one first location point attribute describing a first location of the mobile device (see module 6B20); predicting a shaped geographic region based at least in part on the first location point attribute (see module 6B30); forming a first notification region based at least in part on the shaped geographic region (see module 6B40); selecting a first set of notifications based at least in part on the first notification region, wherein the first set of notifications is limited by at least one of, a mobile device limit, or a notification count (see module 6B50); and transmitting at least a portion of the first set of notifications electronically through the network to the mobile device (see module 6B60).

The system 6B00 supports many variations. For example, after receiving a second location point attribute describing a second location of the mobile device, the system can generate a shaped region based on one or both of the aforementioned first location and/or the second location. System 6B00 can generate a discrete set of candidate trajectories, which in turn can be used to generate a shaped region. Further, the shaped region can be based on a speed, or a highway route, or traffic conditions along the highway route or traffic conditions within the shaped region, or traffic conditions between the generated shaped region and the first location, etc. In some situations, the speed, or highway route, traffic conditions can be uncertain, and in some cases the uncertainty can be quantified. For example, a path or trajectory might be relatively more uncertain when there is a high density of traffic and/or occurrences of traffic jams along the highway route. As such, in situations where a route from a first location to a second location has uncertainty, the generated shaped region may be enlarged closer to the second position (e.g., to reflect the uncertainty). Such a generated shaped region can form a conical or bulbous shaped region.

Still further, the availability of a first position (e.g., a first measured position) and/or a second position (e.g., a second measured position) can be used to make predictions, including a set of measured trajectories, possibly co-segmented along a highway route. For example, using the first position and the second position, a timeframe for reaching a third position, and/or a discrete set of predicted or candidate trajectories, and/or a highway mile marker or other highway position can be predicted.

SYSTEM ARCHITECTURE OVERVIEW

Additional System Architecture Examples

Figure 7A:
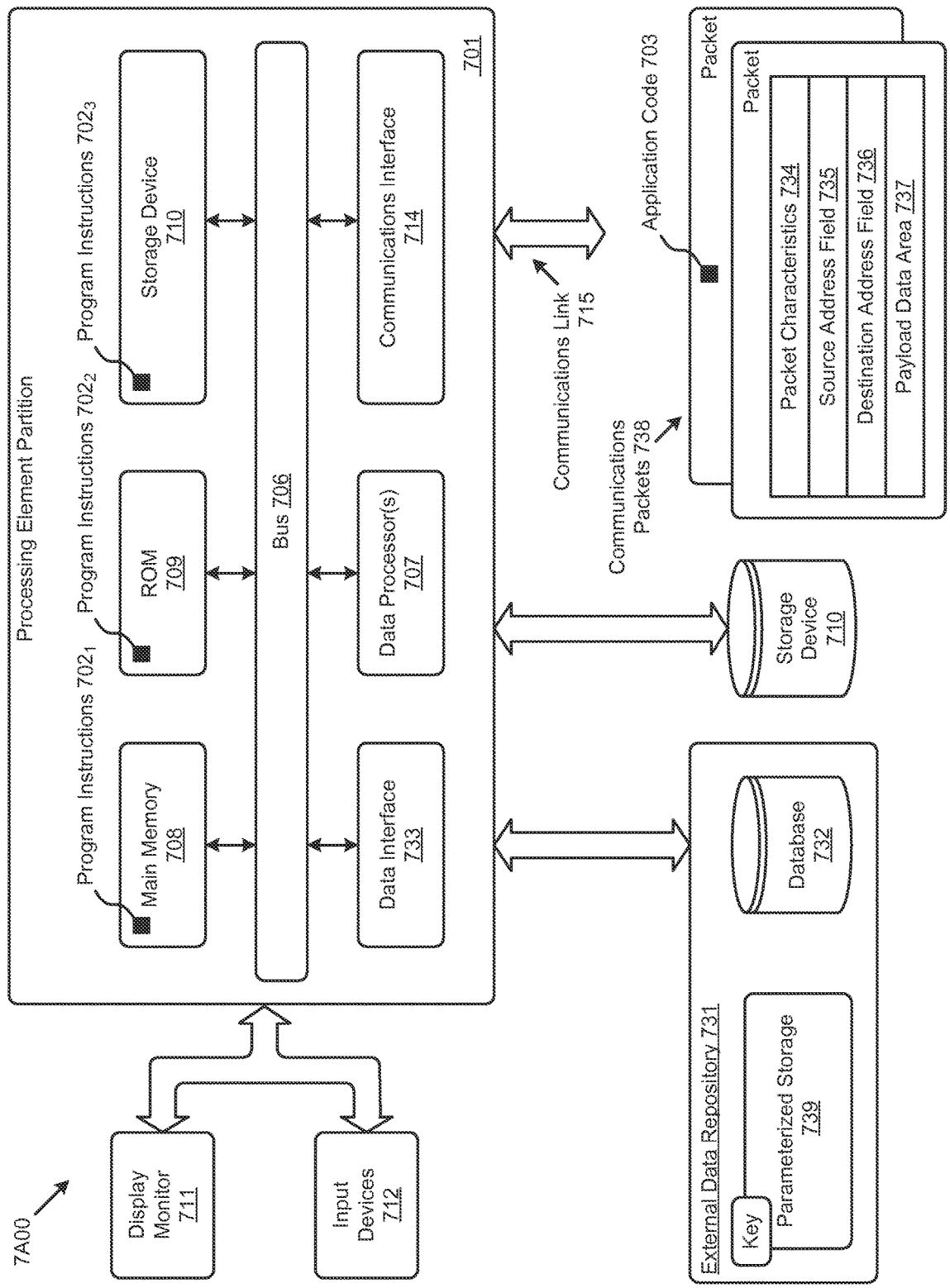
FIG. 7A, FIG. 7B, and FIG. 7C depict exemplary architectures of components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a CPU, or a multi-core CPU (e.g., data processor 707), a system memory (e.g., main memory 708, or an area of random access memory RAM), a non-volatile storage device or non-volatile storage area (e.g., ROM 709), an internal or external storage device 710 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets 738 comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets 738). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the performance characteristics of techniques for delivering geo-context information to a mobile device based on predicted user locations.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of delivering geo-context information to a mobile device based on predicted user locations). Such files or records can be brought into and/or stored in volatile or non-volatile memory.

Figure 7B:
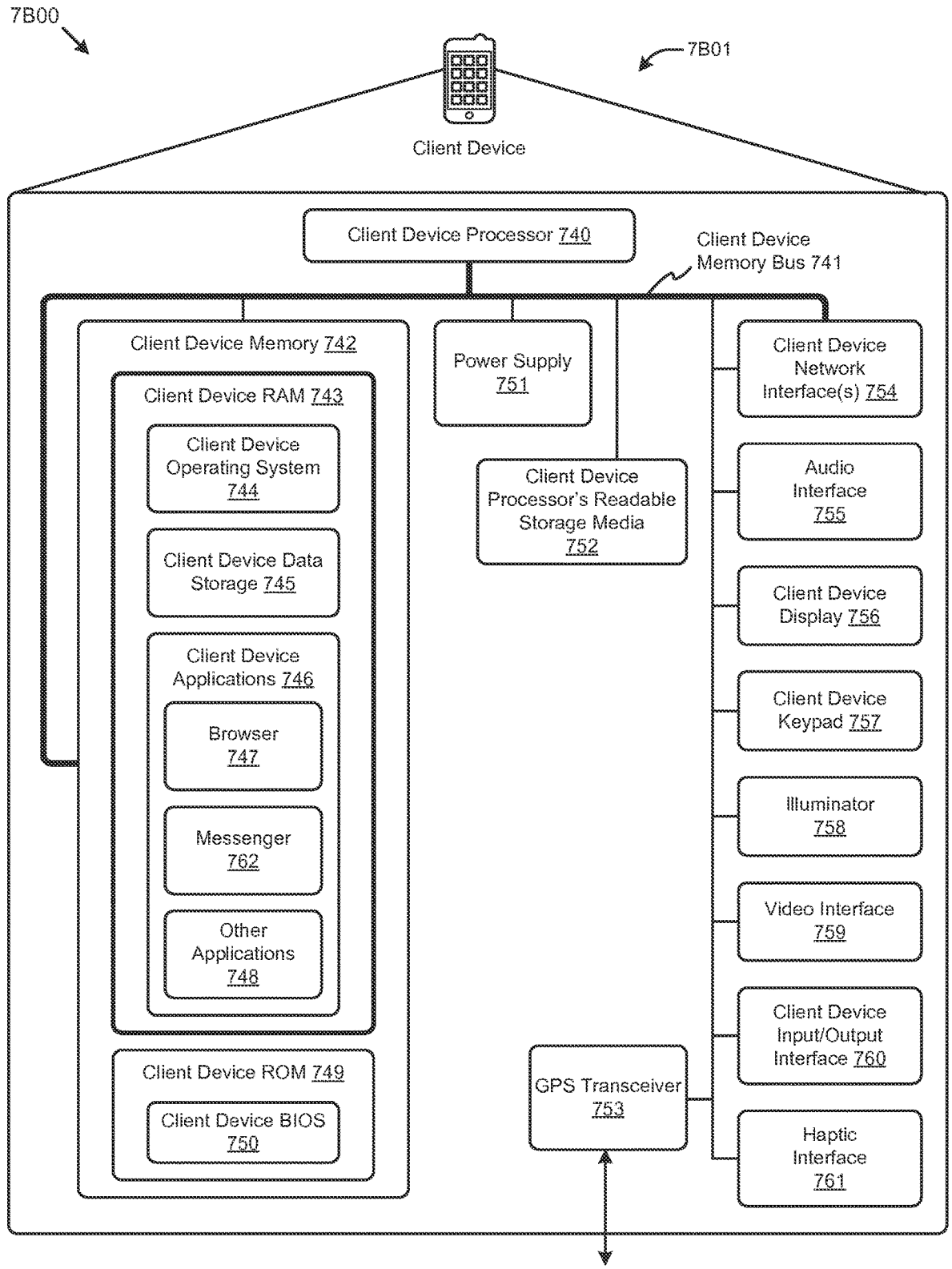

FIG. 7B depicts a block diagram 7B00 of an instance of a client device 7B01 that may be included in a system implementing instances of the herein-disclosed embodiments. Client device 7B01 may include many more or fewer components than those shown in FIG. 7B. Client device 7B01 may represent, for example, an embodiment of at least one of client devices as heretofore disclosed.

As shown in the figure, client device 7B01 includes a client device processor 740 in communication with a client device memory 742 via a client device memory bus 741. Client device 7B01 also includes a power supply 751, one or more client device network interfaces 754, an audio interface 755, a client device display 756, a client device keypad 757, an illuminator 758, a video interface 759, a client device IO interface 760, a haptic interface 761, and a GPS transceiver 753 for global positioning services.

The power supply 751 provides power to client device 7B01. A rechargeable or non-rechargeable battery may be used to provide power. The power may also be provided by an external power source such as an AC adapter or a powered docking cradle that supplements and/or recharges a battery.

A client device 7B01 may optionally communicate with a base station, or directly with another computing device. A client device network interface 754 includes circuitry for coupling a client device 7B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 755 is arranged to produce and receive audio signals such as the sound of a human voice. For example, audio interface 755 may be coupled to a speaker and microphone to enable telecommunication with others and/or generate an audio acknowledgement for some action.

A client device display 756 may be a liquid crystal display (LCD), gas plasma, light emitting diode (LED), or any other type of display used with a computing device. A client device display 756 may also include a touch sensitive screen arranged to receive input from an object such as a stylus or a digit from a human hand.

A client device keypad 757 may comprise any input device arranged to receive input from a user. For example, client device keypad 757 may include a push button numeric dial, or a keyboard. A client device keypad 757 may also include command buttons that are associated with selecting and sending images.

An illuminator 758 may provide a status indication and/or provide light. Illuminator 758 may remain active for specific periods of time or in response to events. For example, when the illuminator 758 is active, it may backlight the buttons on client device keypad 757 and stay on while the client device is powered. Also, the illuminator 758 may backlight these buttons in various patterns when particular actions are performed such as dialing another client device. An illuminator 758 may also cause light sources positioned within a transparent or translucent case of the client device to illuminate in response to actions.

A video interface 759 is arranged to capture video images such as a still photo, a video segment, an infrared video or the like. For example, the video interface 759 may be coupled to a digital video camera, a web-camera or the like. A video interface 759 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 7B01 comprise a client device IO interface 760 for communicating with external devices such as a headset, or other input or output devices not shown in FIG. 7B. The client device IO interface 760 can use one or more communication technologies such as a USB, infrared, Bluetooth™ port or the like. A haptic interface 761 is arranged to as a human interface device (HID) to facilitate interaction with a user of a client device. Such interaction can include tactile feedback to a user of the client device. For example, the haptic interface 761 may be employed to cause vibration of the client device 7B01 in a particular way (e.g., with a pattern or periodicity) and/or when interacting with one or another user.

A GPS transceiver 753 can determine the physical coordinates of client device 7B01 on the surface of the Earth. The GPS transceiver 753, in some embodiments, may be optional. The shown GPS transceiver 753 outputs a location such as a latitude value and a longitude value. However, the GPS transceiver 753 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 7B01 on the surface of the Earth. It is understood that under different conditions, a GPS transceiver 753 can determine a physical location within millimeters for client device 7B01; and in other cases, the determined physical location may be less precise such as within a meter or significantly greater distances. In certain embodiments, the client device 7B01 may provide other information that may be employed to determine a physical location of the device including, for example, a media access control (MAC) address, IP address, IP port identifier, or the like.

The client device memory 742 includes random access memory 743, read-only memory 749, and other computer-readable storage. The client device memory 742 illustrates an example of computer readable storage media (devices) for storage of information such as computer readable instructions, data structures, program modules or other data. The client device memory 742 stores a basic IO system (BIOS) in the embodiment of client device BIOS 750 for controlling low-level operation of client device 7B01. The memory also stores an operating system 744 for controlling the operation of client device 7B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

The client device memory 742 further includes one or more instances of client device data storage 745, which can be used by client device 7B01 to store, among other things, client device applications 746 and/or other data. For example, client device data storage 745 may also be employed to store information that describes various capabilities of client device 7B01. The information may then be provided to another device based on any of a variety of events including being sent as part of a header during a communication, sent upon request or the like. Client device data storage 745 may also be employed to store social networking information including address books, buddy lists, aliases, user profile information or the like. Further, client device data storage 745 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 7B01, etc.

An instance of a client device processor's readable storage media 752 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media may also be referred to herein as computer readable storage media.

The client device applications 746 may include computer executable instructions which, when executed by client device 7B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 746 may include, for example, a messenger 762, a browser 747, and other applications 748. Certain instances of other applications 748 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 748 may collect and store user data that may be received from other computing devices in the environment.

A messenger 762 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 762 may be configured as an IM application such as AOL (America Online) instant messenger, Yahoo! messenger, .NET messenger server, ICQ or the like. In certain embodiments, the messenger 762 may be configured to include a mail user agent (MUA) such as Elm, Pine, message handling (MH), Outlook, Eudora, Mac Mail, Mozilla Thunderbird or the like. In another embodiment, the messenger 762 may be a client device application that is configured to integrate and employ a variety of messaging protocols including, but not limited, to various push and/or pull mechanisms for client device 7B01. In certain embodiments, the messenger 762 may interact with the browser 747 for managing messages.

As used herein, the term "message" refers to any of a variety of messaging formats, or communications form including, but not limited to, email, SMS, IM, MMS, IRC or the like.

A browser 747 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 747 may enable a user of client device 7B01 to communicate with another network device as may be present in the environment.

Figure 7C:
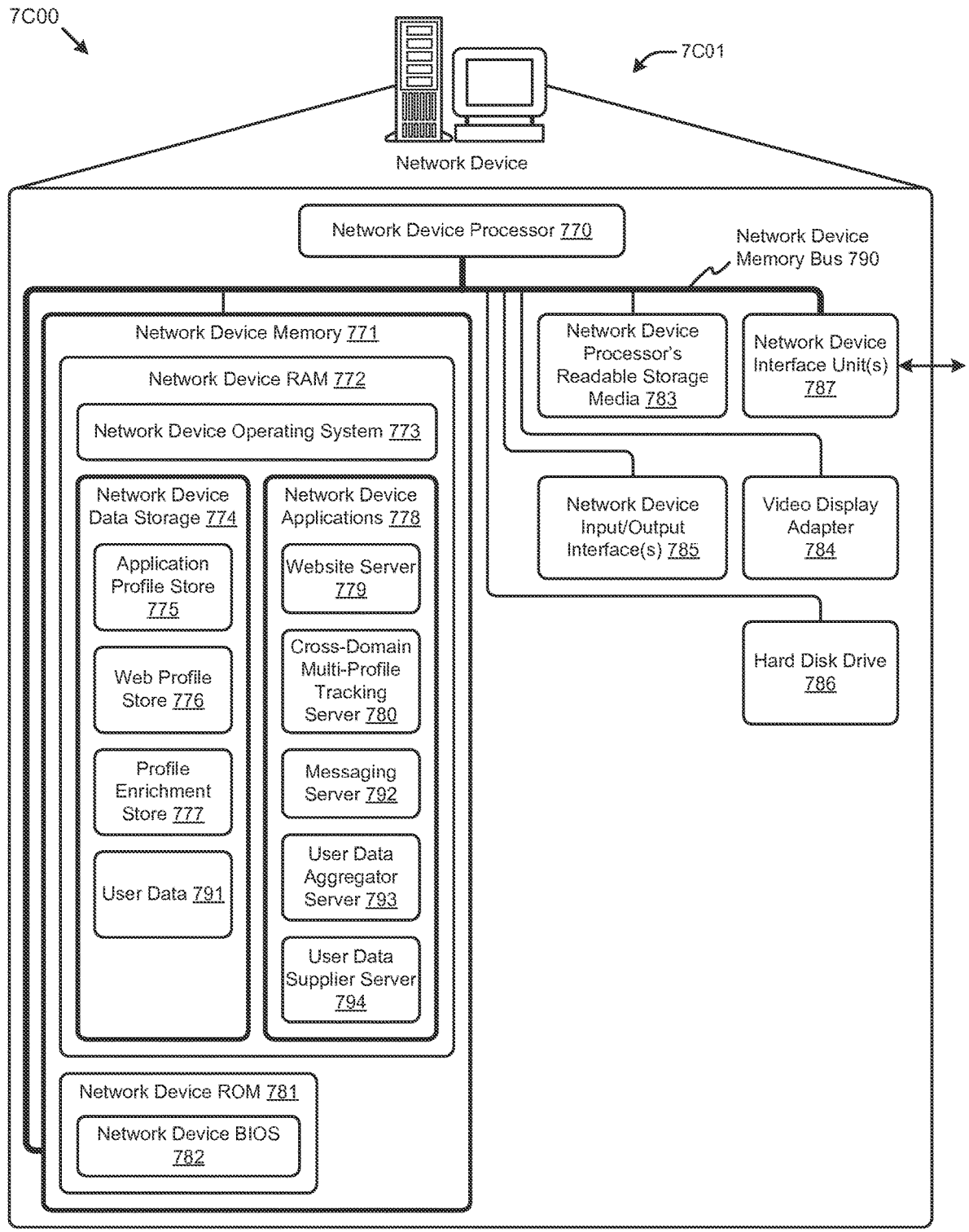

FIG. 7C depicts a block diagram 7C00 of an instance of a network device 7C01 that may be included in a system implementing instances of the herein-disclosed embodiments. Network device 7C01 may include many more or fewer components than those shown. Network device 7C01 may be configured to operate as a server, client, peer, a host, or any other device.

The network device 7C01 includes at least one instance of a network device processor 770, instances of readable storage media, one or more instances of a network interface unit 787, a network device IO interface 785, a hard disk drive 786, a video display adapter 784, and a network device memory 771, all in communication with each other via a network device memory bus 790. The network device memory generally includes network device RAM 772, network device ROM 781. Some embodiments include one or more non-volatile mass storage devices such as a hard disk drive 786, a tape drive, an optical drive, and/or a floppy disk drive. The network device memory stores a network device operating system 773 for controlling the operation of network device 7C01. Any general-purpose operating system may be employed. A basic input/output system (BIOS) is also provided in the form of network device BIOS 782 for controlling the low-level operation of network device 7C01. As illustrated in FIG. 7C, a network device 7C01 also can communicate with the Internet, or some other communications network, via a network interface unit 787, which is constructed for use with various communication protocols including the TCP/IP protocol. A network interface unit 787 is sometimes known as a transceiver, a transceiving device, or a network interface card (NIC). Network device 7C01 also comprises a network device IO interface 785 for communicating with external devices such as a keyboard or other input or output devices. A network device IO interface 785 can use one or more communication technologies such as USB, infrared, Bluetooth™ or the like.

The storage devices as described above may use various types of computer readable media, namely tangible forms of non-volatile computer readable storage media and/or a client device processor's readable storage media 752 and/or a network device processor's readable storage media 783. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 774 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 774 may further include program code, data, algorithms and the like, for use by a processor such as a network device processor 770 to execute and perform actions. In certain embodiments, at least some of the logical contents of network device data storage 774 might be stored on another component of network device 7C01 such as on a second instance of hard disk drive 786 or on an external/removable storage device.

The network device data storage 774 may further store any portions of application data and/or user data such as an application profile store 775, a web profile store 776, a profile enrichment store 777 and/or any user data collected. In some embodiments, stored user data 791 may store unique user data, non-unique user data, aggregated user data, and/or any combination thereof. User data may include a variety of attributes such as a five digit zip code, an expanded nine digit zip code and the like.

The Network device data storage 774 may also store program code and data. One or more network device applications 778 may be loaded into network device data storage or any other mass memory, to be accessible to run with or as a part of network device operating system 773. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 792, website server 779, user data aggregator server 793, a cross-domain multi-profile tracking server 780, and/or user data supplier server 794 may also be included within or implemented as application programs.

A messaging server 792 may include virtually any computing component or components configured and arranged to forward messages from message user agents and/or other message servers, or to deliver messages to a local message store such as network device data storage 774 or the like. Thus, a messaging server 792 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 792 may also be managed by one or more components of the messaging server 792. Thus, the messaging server 792 may also be configured to manage SMS messages; IM, MMS, IRC, or RSS feeds; mIRC; or any of a variety of other message types. In certain embodiments, the messaging server 792 may enable users to initiate and/or otherwise conduct chat sessions, VOIP sessions or the like.

A website server 779 may represent any of a variety of information and services that are configured to provide content, including messages, over a network to another computing device. Thus, a website server 779 can include, for example, a web server, a file transfer protocol (FTP) server, a database server, a content server or the like. A website server 779 may provide the content including messages over the network using any of a variety of formats including, but not limited to WAP, HDML, WML, SGML, HTML, XML, compact HTML (cHTML), extensible HTML (xHTML) or the like. A website server 779 may also be configured to enable a user of a client device to browse websites, upload user data, view and interact with advertisements or the like.

A user data aggregator server 793 is configured to aggregate user data to be provided to user data buyers for advertising campaigns. In certain embodiments, a user data aggregator server 793 may be configured to receive collected user data from a user data supplier server 794. In some embodiments, a user data aggregator server 793 may receive a query for user data. Based on the query, a user data aggregator server 793 may generate a plurality of subsets of aggregated user data. In some embodiments, user data aggregator server 793 may be included in a network device.

A user data supplier server 794 is configured to collect user data. In certain embodiments, the user data supplier server 794 may be configured to provide the collected user data to user data aggregator server 793. In some embodiments, the user data supplier server 794 may collect and/or provide unique user data and/or non-unique user data. In certain embodiments, the user data supplier server 794 may aggregate the collected user data. In some embodiments, the user data supplier server 794 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   receiving, from a mobile device, over a network, at least one first location point attribute describing a first location of the mobile device;
   generating a shaped region having a shape and based at least in part on the first location and at least one candidate trajectory of a discrete set of candidate trajectories, further comprising determining an amount of uncertainty of the at least one candidate trajectory, wherein the shape is determined by at least a direction of travel of the mobile device, a route of travel of the mobile device, and traffic conditions in order to predict a future location of the mobile device, the shape determined to be a first non-circular shape based on a first direction of travel or determined to be a second non-circular shape, different than the first non-circular shape, based on the amount of uncertainty;

forming a first notification region based at least in part on the shaped region and a geographic density of location points in a vicinity of the shaped region, wherein a specified maximum number of closest location points defines a size of the first notification region, the first notification region having the shape and the size that encompasses both the location points and a travel path of the mobile device based on the direction of travel, the size of the first notification region further based on a memory limitation of the mobile device that limits a number of notifications wherein the number of notifications is related to at least one of a size of a memory, a number of notifications limit or a rate of notifications limit;

selecting a first set of notifications based at least in part on the first notification region, wherein the first set of notifications is based at least in part on at least one of, a mobile device limit, or a notification count; and transmitting at least a portion of the first set of notifications electronically through the network to the mobile device.

2. The method of claim 1, wherein the first set of notifications comprises at least one of an advertisement or a coupon, or a combination thereof.

3. The method of claim 1, further comprising:
receiving, after a finite amount of time has passed, at least one second location point attribute describing a second location of the mobile device;
adjusting the first notification region to form a second notification region;
selecting at least a portion of a second set of notifications, wherein the selecting is based at least in part on the second notification region; and
transmitting at least a portion of the second set of notifications to the mobile device.

4. The method of claim 3, wherein the portion of the second set of notifications is determined based at least in part on network speed conditions.

5. The method of claim 1, wherein the first set of notifications is determined based at least in part on at least one of, promotional data, or user preferences, or user purchase history, or weather conditions in the first notification region, or traffic conditions in the first notification region, or any combination thereof.

6. The method of claim 1, wherein the shaped region is based on a speed, a highway route, traffic conditions in the shaped region, and traffic conditions between the shaped region and the first location.

7. The method of claim 1, wherein the first non-circular shape comprises an oblong shape and the second non-circular shape comprises the shape of a conical shape or a bulbous shape.

8. The method of claim 1, further comprising transmitting one or more geo-context rules, or one or more geo-context triggers, or any combination thereof.

9. The method of claim 8, wherein the geo-context rules are executed by the mobile device.

10. The method of claim 1, wherein the first set of notifications is based on a mobile device limit comprising an amount of memory on the mobile device.

11. The method of claim 1, further comprising predicting a first notification region based on at least one measured position and at least one measured trajectory.

12. The method of claim 1, wherein the shaped region is based at least in part on an uncertainty value of at least one of, a speed, or a highway route, or traffic conditions in the shaped region, or traffic conditions between the shaped region and the first location, or any combination thereof.

13. A computer program product, embodied in a non-transitory computer readable medium, the non-transitory computer readable medium having stored thereon a sequence of instructions which, when stored in memory and executed by a processor causes the processor to perform a set of acts, the acts comprising:
receiving, from a mobile device, over a network, at least one first location point attribute describing a first location of the mobile device;
generating a shaped region having a shape and based at least in part on the first location and at least one candidate trajectory of a discrete set of candidate trajectories, further comprising determining an amount of uncertainty of the at least one candidate trajectory, wherein the shape is determined by at least a direction of travel of the mobile device, a route of travel of the mobile device, and traffic conditions in order to predict a future location of the mobile device, the shape determined to be a first non-circular shape based on a first direction of travel or determined to be a second non-circular shape, different than the first non-circular shape, based on the amount of uncertainty;
forming a first notification region based at least in part on the shaped region and a geographic density of location points in a vicinity of the shaped region, wherein a specified maximum number of closest location points defines a size of the first notification region, the first notification region having the shape and the size that encompasses both the location points and a travel path of the mobile device based on the direction of travel, the size of the first notification region further based on a memory limitation of the mobile device that limits a number of notifications wherein the number of notifications is related to at least one of a size of a memory, a number of notifications limit or a rate of notifications limit;
selecting a first set of notifications based at least in part on the first notification region, wherein the first set of notifications is based at least in part on at least one of, a mobile device limit, or a notification count; and
transmitting at least a portion of the first set of notifications electronically through the network to the mobile device.

14. The computer program product of claim 13, wherein the first set of notifications comprises at least one of an advertisement or a coupon, or a combination thereof.

15. The computer program product of claim 13, further comprising instructions which, when stored in memory and executed by a processor causes the processor to perform the acts of:
receiving, after a finite amount of time has passed, at least one second location point attribute describing a second location of the mobile device;
adjusting the first notification region to form a second notification region;
selecting at least a portion of a second set of notifications, wherein the selecting is based at least in part on the second notification region; and
transmitting at least a portion of the second set of notifications to the mobile device.

16. The computer program product of claim 15, wherein the portion of the second set of notifications is determined based at least in part on network speed conditions.

17. The computer program product of claim 13, wherein the first set of notifications is determined based at least in part on at least one of, promotional data, or user preferences, or user purchase history, or weather conditions in the first notification region, or traffic conditions in the first notification region, or any combination thereof.

18. The computer program product of claim 13, wherein the shaped region is based on a speed, a highway route, traffic conditions in the shaped region, and traffic conditions between the shaped region and the first location.

19. The computer program product of claim 13, wherein the first non-circular shape comprises an oblong shape and the second non-circular shape comprises the shape of a conical shape or a bulbous shape.

20. The computer program product of claim 13, further comprising instructions which, when stored in memory and executed by a processor causes the processor to perform acts of transmitting one or more geo-context rules, or one or more geo-context triggers, or any combination thereof.

21. The computer program product of claim 13, further comprising instructions which, when stored in memory and executed by a processor causes the processor to perform acts of predicting a first notification region based on at least one measured position and at least one measured trajectory.

22. The computer program product of claim 13, wherein the shaped region is based at least in part on an uncertainty value of at least one of, a speed, or a highway route, or traffic conditions in the shaped region, or traffic conditions between the shaped region and the first location, or any combination thereof.

23. A mobile device notification system comprising:
a communications interface;
one or more processors coupled to the communications interface, the processors adapted to execute instructions and implement functionality comprising:
receiving, from the mobile device, over a network via the communications interface, at least one first location point attribute describing a first location of the mobile device;
generating a shaped region having a shape and based at least in part on the first location and at least one candidate trajectory of a discrete set of candidate trajectories, further comprising determining an amount of uncertainty of the at least one candidate trajectory, wherein the shape is determined by at least a direction of travel of the mobile device, a route of travel of the mobile device, and traffic conditions in order to predict a future location of the mobile device, the shape determined to be a first non-circular shape based on a first direction of travel or determined to be a second non-circular shape, different than the first non-circular shape, based on the amount of uncertainty;
forming a first notification region based at least in part on the shaped region and a geographic density of location points in a vicinity of the shaped region, wherein a specified maximum number of closest location points defines a size of the first notification region, the first notification region having the shape and the size that encompasses both the location points and a travel path of the mobile device based on the direction of travel, the size of the first notification region further based on a memory limitation of the mobile device that limits a number of notifications wherein the number of notifications is related to at least one of a size of a memory, a number of notifications limit or a rate of notifications limit;
selecting a first set of notifications based at least in part on the first notification region, wherein the first set of notifications is based at least in part on at least one of, a mobile device limit, or a notification count; and
transmitting at least a portion of the first set of notifications electronically through the network via the communications interface to the mobile device.

24. The system of claim 23, wherein the amount of uncertainty is based at least in part on the traffic condition along the route of travel.

25. The system of claim 23, wherein the first set of notifications is based on weather conditions in the first notification region.

* * * * *